United States Patent
Aruga et al.

(10) Patent No.: US 12,535,680 B2
(45) Date of Patent: *Jan. 27, 2026

(54) LIGHT SOURCE UNIT AND IMAGE DISPLAY DEVICE

(71) Applicant: NICHIA CORPORATION, Anan (JP)

(72) Inventors: Takanori Aruga, Suwa-gun (JP); Wataru Kitahara, Kamiina-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,112

(22) Filed: Dec. 13, 2023

(65) Prior Publication Data

US 2024/0210683 A1    Jun. 27, 2024

(30) Foreign Application Priority Data

Dec. 26, 2022  (JP) ................. 2022-208656

(51) Int. Cl.
| | | |
|---|---|---|
| *G02B 27/01* | (2006.01) | |
| *G02B 5/30* | (2006.01) | |
| *G02B 27/09* | (2006.01) | |

(52) U.S. Cl.
CPC ....... *G02B 27/0101* (2013.01); *G02B 5/3083* (2013.01); *G02B 27/0977* (2013.01); *G02B 2027/0112* (2013.01)

(58) Field of Classification Search
CPC .................................... G02B 27/01
See application file for complete search history.

(56) References Cited

U.S. PATENT DOCUMENTS

| | | |
|---|---|---|
| 5,764,407 A | 6/1998 | Nanba |
| 10,606,075 B2 | 3/2020 | Choi et al. |
| 11,169,377 B1 | 11/2021 | Chen |
| 11,287,649 B2 | 3/2022 | Hong |

(Continued)

FOREIGN PATENT DOCUMENTS

| | | |
|---|---|---|
| JP | H03-273943 A | 12/1991 |
| JP | H06-347708 A | 12/1994 |

(Continued)

OTHER PUBLICATIONS

U.S. Appl. No. 18/390,954, filed Dec. 20, 2023, Kitahara et al.

(Continued)

*Primary Examiner* — Roy P Rabindranath
(74) *Attorney, Agent, or Firm* — Foley & Lardner LLP

(57) ABSTRACT

A light source unit includes: a display device configured to emit light having a substantially Lambertian light distribution and to display an image, the display device including a plurality of pixels arranged in a matrix configuration in a same plane, wherein pixels among the plurality of pixels located at an outermost perimeter are arranged so that straight lines connecting centers of the pixels located at the outermost perimeter do not form a rectangle; and an imaging optical system including: an input element on which light emitted from the display device is incident, and an output element on which light traveling via the input element is incident, light emitted from the output element forming a first image corresponding to the image. The imaging optical system is substantially telecentric at a first image side.

15 Claims, 17 Drawing Sheets

(56) References Cited

U.S. PATENT DOCUMENTS

| | | |
|---|---|---|
| 2003/0035232 A1 | 2/2003 | Sasaki |
| 2003/0107716 A1 | 6/2003 | Ogawa |
| 2004/0145814 A1 | 7/2004 | Rogers |
| 2005/0007593 A1 | 1/2005 | Lebens |
| 2005/0052617 A1 | 3/2005 | Fujikawa et al. |
| 2007/0024977 A1 | 2/2007 | Kawamura et al. |
| 2007/0146242 A1* | 6/2007 | Miller ............... G09G 3/2074 345/76 |
| 2008/0316606 A1 | 12/2008 | Inoguchi et al. |
| 2009/0040588 A1* | 2/2009 | Tonar ................ B60R 1/1207 359/267 |
| 2010/0109977 A1 | 5/2010 | Yamazaki et al. |
| 2010/0271396 A1 | 10/2010 | Nemeth et al. |
| 2011/0164311 A1 | 7/2011 | Morikuni |
| 2015/0253469 A1* | 9/2015 | Le Gros ............. G02B 13/22 359/619 |
| 2015/0378104 A1 | 12/2015 | Takahashi |
| 2017/0146803 A1 | 5/2017 | Kishigami et al. |
| 2018/0024335 A1 | 1/2018 | Uehara |
| 2018/0039077 A1 | 2/2018 | Kuzuhara et al. |
| 2018/0352204 A1 | 12/2018 | Fujita |
| 2018/0358339 A1 | 12/2018 | Iguchi |
| 2019/0011712 A1 | 1/2019 | Nagano et al. |
| 2019/0049725 A1 | 2/2019 | Kondo et al. |
| 2019/0061525 A1 | 2/2019 | Ji |
| 2019/0061638 A1 | 2/2019 | Hisatsugu et al. |
| 2019/0071014 A1 | 3/2019 | Misu |
| 2019/0072764 A1 | 3/2019 | Lee et al. |
| 2019/0072799 A1 | 3/2019 | Narushima |
| 2019/0073828 A1 | 3/2019 | Oiwa |
| 2020/0201036 A1 | 6/2020 | Hong |
| 2020/0271927 A1 | 8/2020 | Kawana |
| 2020/0319456 A1 | 10/2020 | Yatsu et al. |
| 2020/0333608 A1 | 10/2020 | Katagiri et al. |
| 2021/0239989 A1 | 8/2021 | Ide et al. |
| 2021/0325700 A1 | 10/2021 | Chen |
| 2021/0373331 A1 | 12/2021 | Gu et al. |
| 2021/0382304 A1 | 12/2021 | You et al. |
| 2022/0035165 A1 | 2/2022 | Takeda et al. |
| 2022/0138916 A1 | 5/2022 | Takagi et al. |
| 2022/0350139 A1* | 11/2022 | Tsuda ................ B60K 35/29 |
| 2022/0365266 A1 | 11/2022 | Cheng et al. |
| 2022/0365345 A1 | 11/2022 | Hamada |
| 2023/0026137 A1 | 1/2023 | Kusafuka et al. |
| 2023/0034288 A1* | 2/2023 | Hong ............... G02B 27/0172 |
| 2023/0118416 A1 | 4/2023 | Hirata et al. |
| 2023/0206795 A1* | 6/2023 | Lyou .................. G09G 3/32 345/204 |
| 2023/0415576 A1 | 12/2023 | Zozgornik |
| 2024/0061240 A1 | 2/2024 | Hirata et al. |
| 2024/0210684 A1* | 6/2024 | Kitahara ........... G02B 27/0101 |
| 2024/0241421 A1* | 7/2024 | Marchewka ........... G09F 9/372 |

FOREIGN PATENT DOCUMENTS

| | | |
|---|---|---|
| JP | H07-140918 A | 6/1995 |
| JP | H07-306377 A | 11/1995 |
| JP | H09-200651 A | 7/1997 |
| JP | H10-274740 A | 10/1998 |
| JP | 2003-005073 A | 1/2003 |
| JP | 2003-043360 A | 2/2003 |
| JP | 2003-177320 A | 6/2003 |
| JP | 2004-045718 A | 2/2004 |
| JP | 2004-527801 A | 9/2004 |
| JP | 2005-070255 A | 3/2005 |
| JP | 2009-003128 A | 1/2009 |
| JP | 2009-251194 A | 10/2009 |
| JP | 2010-107873 A | 5/2010 |
| JP | 2011-138086 A | 7/2011 |
| JP | 2013-183042 A | 9/2013 |
| JP | 2016-033867 A | 3/2016 |
| JP | 2016-102810 A | 6/2016 |
| JP | 2016-148829 A | 8/2016 |
| JP | 2017-037304 A | 2/2017 |
| JP | 2017-049371 A | 3/2017 |
| JP | 2019-073272 A | 5/2019 |
| JP | 2019-095690 A | 6/2019 |
| JP | 2020-012986 A | 1/2020 |
| JP | 2020-074005 A | 5/2020 |
| JP | 2020-144184 A | 9/2020 |
| JP | 6809441 B2 | 1/2021 |
| JP | 2021-124527 A | 8/2021 |
| JP | 2021-162801 A | 10/2021 |
| JP | 2021-529332 A | 10/2021 |
| JP | 2022-025889 A | 2/2022 |
| JP | 2022-073094 A | 5/2022 |
| JP | 2022-129223 A | 9/2022 |
| WO | WO-2015/190157 A1 | 12/2015 |
| WO | WO-2016/103418 A1 | 6/2016 |
| WO | WO-2016/208195 A1 | 12/2016 |
| WO | WO-2017/138242 A1 | 8/2017 |
| WO | WO-2017/154360 A1 | 9/2017 |
| WO | WO-2017/170702 A1 | 10/2017 |
| WO | WO-2019/008684 A1 | 1/2019 |
| WO | WO-2019/130860 A1 | 7/2019 |
| WO | WO-2019/130944 A1 | 7/2019 |
| WO | WO-2021/054277 A1 | 3/2021 |
| WO | WO-2021/065820 A1 | 4/2021 |
| WO | WO-2021/106689 A1 | 6/2021 |

OTHER PUBLICATIONS

U.S. Appl. No. 18/543,762, filed Dec. 18, 2023, Kitahara et al.
Notice of Allowance in U.S. Appl. No. 18/513,895 dtd Aug. 6, 2024.
Non-Final Office Action in U.S. Appl. No. 18/496,594 dtd Jul. 11, 2024.
U.S. Appl. No. 18/496,594, filed Oct. 27, 2023, Kitahara et al.
U.S. Appl. No. 18/511,505, filed Nov. 16, 2023, Kitahara et al.
U.S. Appl. No. 18/513,895, filed Nov. 20, 2023, Kitahara et al.
U.S. Appl. No. 18/538,112, filed Dec. 13, 2023, Aruga et al.
U.S. Appl. No. 18/691,498, filed Mar. 13, 2024, Kitahara et al.
U.S. Appl. No. 18/867,745, filed Nov. 20, 2024, Kitahara et al.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.

\* cited by examiner

LIGHT SOURCE UNIT AND IMAGE DISPLAY DEVICE

CROSS-REFERENCE TO RELATED APPLICATIONS

This application is based upon and claims priority to Japanese Patent Application No. 2022-208656, filed on Dec. 26, 2022, the entire contents of which are incorporated herein by reference.

FIELD

Embodiments described herein relate generally to a light source unit and an image display device.

BACKGROUND

PCT Publication No. WO2016/208195 discusses technology in which light emitted from a display device configured to display an image is sequentially reflected by multiple mirrors, and the light reflected by the final mirror is further reflected toward a user by a reflecting member such as a windshield or the like, so that the user views a virtual image corresponding to the image displayed by the display device.

SUMMARY

An embodiment of the invention is directed to a light source unit and an image display device that are small and can display a high-quality image.

A light source unit according to an embodiment of the invention includes a display device configured to display an image, and an imaging optical system including an input element and an output element; light emitted from the display device is incident on the input element; light traveling via the input element is incident on the output element; and light emitted from the output element forms a first image corresponding to the image. The imaging optical system is substantially telecentric at the first image side. The light that is emitted from the display device has a substantially Lambertian light distribution. The display device includes multiple pixels. The multiple pixels are arranged at a same plane. Pixels among the multiple pixels located at an outermost perimeter are arranged so that straight lines connecting centers of the pixels located at the outermost perimeter do not form a rectangle.

A light source unit according to an embodiment of the invention includes a display device configured to display an image, and an imaging optical system including an input element and an output element; light emitted from the display device is incident on the input element; light traveling via the input element is incident on the output element; and light emitted from the output element forms a first image corresponding to the image. The imaging optical system is substantially telecentric at the first image side.

The light that is emitted from the display device has a substantially Lambertian light distribution. The display device includes multiple pixels. The multiple pixels are arranged at a same curved surface.

A light source unit according to an embodiment of the invention includes a display device configured to display an image, a mirror reflecting light emitted from the display device to form a first image corresponding to the image, a reflective polarizing element located between the display device and the mirror, and a waveplate located between the reflective polarizing element and the mirror. The reflective polarizing element transmits a first polarized light of the light emitted from the display device. The waveplate converts the first polarized light transmitted by the reflective polarizing element into a circularly polarized light. The mirror reflects, toward the waveplate, the circularly polarized light emitted from the waveplate. The waveplate converts the circularly polarized light reflected by the mirror into a second polarized light. The reflective polarizing element reflects, toward a formation position of the first image, the second polarized light emitted from the waveplate. The mirror is substantially telecentric at the first image side. The light that is emitted from the display device has a substantially Lambertian light distribution. The display device includes multiple pixels. The multiple pixels are arranged in a plane. Pixels among the multiple pixels located at an outermost perimeter are arranged so that straight lines connecting centers of the pixels located at the outermost perimeter do not form a rectangle.

A light source unit according to an embodiment of the invention includes a display device configured to display an image, a mirror reflecting light emitted from the display device to form a first image corresponding to the image, a reflective polarizing element located between the display device and the mirror, and a waveplate located between the reflective polarizing element and the mirror. The reflective polarizing element transmits a first polarized light of the light emitted from the display device. The waveplate converts the first polarized light transmitted by the reflective polarizing element into a circularly polarized light. The mirror reflects, toward the waveplate, the circularly polarized light emitted from the waveplate. The waveplate converts the circularly polarized light reflected by the mirror into a second polarized light. The reflective polarizing element reflects, toward a formation position of the first image, the second polarized light emitted from the waveplate. The mirror is substantially telecentric at the first image side. The light that is emitted from the display device has a substantially Lambertian light distribution. The display device includes multiple pixels. The multiple pixels are arranged on a curved surface.

An image display device according to an embodiment of the invention includes the light source unit, and a reflection unit separated from the light source unit, wherein the reflection unit reflects light emitted from the imaging optical system. The first image is formed between the light source unit and the reflection unit.

DETAILED DESCRIPTION

Figure 1:
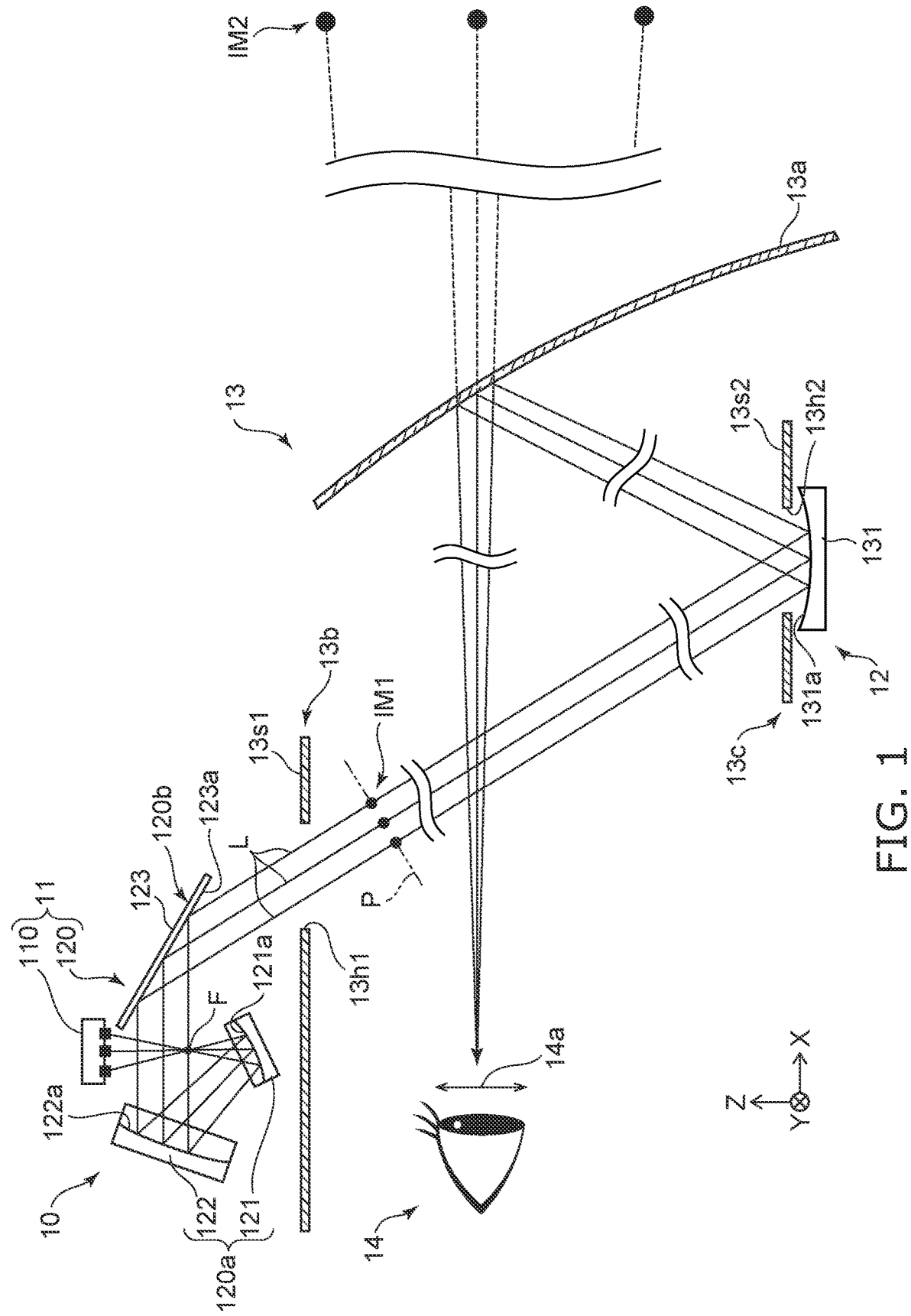
FIG. 1 is a schematic cross-sectional view showing a head-up display in which an image display device according to a first embodiment is applied.

Exemplary embodiments will now be described with reference to the drawings. The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions. In the specification of the application and the drawings, components similar to those described in regard to a drawing thereinabove are marked with like reference numerals, and a detailed description is omitted as appropriate.

First Embodiment

FIG. 1 is a cross-sectional view showing a head-up display in which an image display device according to a first embodiment is applied.

As shown in FIG. 1, the image display device 10 according to the embodiment includes a light source unit 11 and a reflection unit 12. In FIG. 1, the image display device 10 is partially enlarged to more clearly show the configurations of the light source unit 11 and the reflection unit 12. This is similar for the illustration of an image display device 70A according to a fourth embodiment described below with reference to FIG. 15.

The light source unit 11 includes a display device 110 configured to display an image, and an imaging optical system 120, light that is emitted from the display device 110 is incident on the imaging optical system 120, and the imaging optical system 120 forms a first image IM1 corresponding to the image displayed by the display device 110. The reflection unit 12 reflects the light emitted from the light source unit 11. The first image IM1 is formed between the light source unit 11 and the reflection unit 12. The first image IM1 is a real image and is an intermediate image. In the drawings, the position at which the first image IM1 is formed is shown by circular marks for easier understanding of the description. The emission positions in the display device 110 of main rays L that reach the marks of the first image IM1 are shown by quadrilateral marks. Thus, although different marks are used to show the emission positions on the display device 110 and the arrival positions at the first image IM1 of the main rays L for easier understanding of the description, the first image IM1 and the image displayed on the display device 110 have substantially similar shapes.

For example, the image display device 10 is mounted in a vehicle 13 of an automobile or the like and is applied to a HUD (Head Up Display). Specifically, the greater part of the light reflected by the reflection unit 12 is reflected by a surface of a front windshield 13a of the vehicle 13 facing a user 14 inside the vehicle, i.e., the inner surface of the front windshield 13a, and enters an eyebox 14a of the user 14 that is a driver of the vehicle 13, etc. In other words, the inner surface of the front windshield 13a of the vehicle 13 functions as a reflecting surface. However, instead of the front windshield, the reflecting surface may be a surface of a combiner facing the user. As a result, the user 14 can view a second image IM2 corresponding to the image displayed by the display device 110. The second image IM2 is a virtual image that is larger than the first image IM1. The front windshield 13a and other reflecting surfaces are not limited to planes and may be curved as shown in FIG. 1.

In the specification, "eyebox" means the area of space in front of the eyes of the user where the virtual image is visible. In the drawings, similarly to the first image IM1, the position at which the second image IM2 is formed is shown by circular marks for easier understanding of the description. Similar to the first image IM1, although the emission positions on the display device 110 and the arrival positions at the second image IM2 of the main rays L are shown by marks of different shapes, the second image IM2 and the image displayed on the display device 110 have substantially similar shapes.

A configuration of the display device 110 will now be described.

Figure 2:
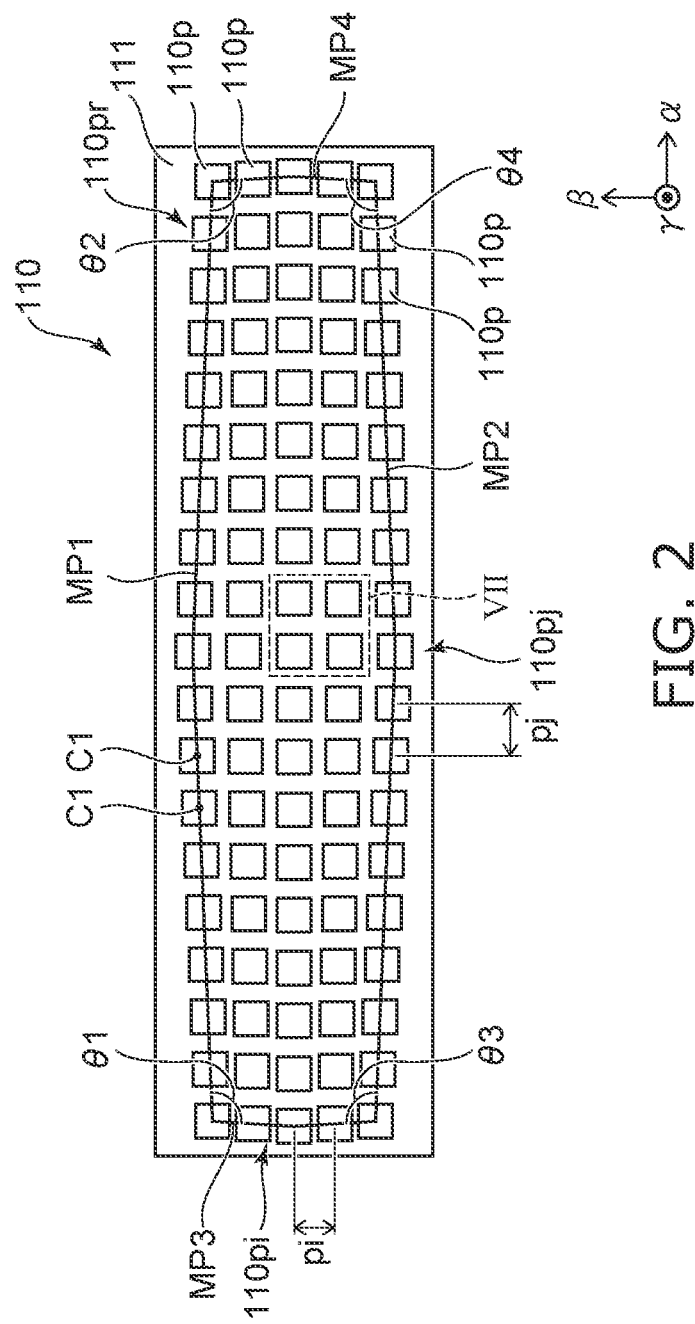
FIG. 2 is a schematic plan view illustrating a display device of the image display device according to the first embodiment.

FIG. 2 is a schematic plan view illustrating the display device of the image display device according to the first embodiment.

As shown in FIG. 2, the display device 110 includes multiple pixels 110p. The display device 110 is, for example, an LED display. As described below with reference to FIGS. 7 to 9, the pixel 110p includes an LED (Light-Emitting Diode) element 112. The pixel 110p may include one LED element 112 or multiple LED elements 112. For example, the display device 110 is electrically connected to a controller (not illustrated) mounted in the vehicle 13 and displays, for example, an image corresponding to the state of the vehicle 13.

As shown in FIG. 1, XYZ coordinates that are described below may be used when describing the configuration and operation of the image display device 10. When describing the configuration and operation of the display device 110 as shown in FIG. 2, a three-dimensional orthogonal coordinate system made of an α-axis, a β-axis, and a γ-axis may be used separately from the XYZ coordinates. The αβ-plane that includes the α-axis and the β-axis is taken as a plane parallel to a first surface 111-1 of a substrate 111 of the LED element 112 described with reference to FIGS. 8A and 8B. In a pixel row 110pi, the pixels 110p are arranged in the direction of the α-axis. In a pixel column 110pj, the pixels 110p are arranged in the direction of the β-axis. The direction from a second surface 111-2 toward the first surface 111-1 of the substrate 111 is taken as the positive direction of the γ-axis. The second surface 111-2 of the substrate 111 is the surface at the side opposite to the first surface 111-1 of the substrate 111.

The positive direction of the α-axis is called the "+α direction," and the negative direction of the α-axis is called the "−α direction." The positive direction of the β-axis is called the "+β direction," and the negative direction of the β-axis is called the "−β direction." The positive direction of the γ-axis is called the "+γ direction," and the negative direction of the γ-axis is called the "−γ direction." Simply "when viewed in plan" may be used when viewing a plane parallel to the αβ-plane from the +γ direction or the −γ direction.

The multiple pixels 110p are arranged substantially along the α-direction and substantially along the β-direction. More specifically, the multiple pixels 110p are arranged in a matrix configuration at a plane parallel to the αβ-plane. The multiple pixels 110p form a pixel array 110pr of m rows×n columns. m and n are arbitrary natural numbers such that m>2 and n>2. The pixel array 110pr includes m rows of the pixel rows 110pi arranged in the α-direction and n columns of the pixel columns 110pj arranged in the β-direction. In the example shown in FIG. 2, five rows×nineteen columns of the pixels 110p are arranged in the pixel array 110pr. As described below, the pixels 110p that are arranged in the α-direction are not limited to being arranged parallel to the α-axis and include being curved or bent in the +β direction or the −β direction, or arranged in a straight line at an angle from the α-axis. Also, the pixels 110p that are arranged in the β-direction are not limited to being arranged parallel to the β-axis and include being curved or bent in the +α direction or the −α direction, or arranged in a straight line at an angle from the β-axis.

The distance between two adjacent pixels 110p in the pixel column 110pj of the pixel array 110pr is called a column-direction pitch pi of the pixels 110p or simply the column-direction pitch pi. The distance between two adjacent pixels 110p in the pixel row 110pi is called a row-direction pitch pj of the pixels 110p or simply the row-direction pitch pj. The distance between the two adjacent pixels 110p is taken to be the distance between centers C1 of the pixels 110p. For example, when the shape of the pixel 110p is a quadrilateral when viewed in plan, the center C1 of the pixel 110p is the intersection of the diagonals of the quadrilateral, and when the shape of the pixel 110p is circular or elliptical when viewed in plan, the center C1 is the center point. More generally, the center C1 of the pixel 110p is the centroid of the shape of the pixel 110p when viewed in plan. The column-direction pitch and the row-direction pitch are similarly defined for the pixel arrays of the modifications described below with reference to FIGS. 4A to 6.

According to the embodiment, the column-direction pitch pi and the row-direction pitch pj of the pixel array 110pr of the display device 110 are set according to the distortion in the two-dimensional plane of the optical system. Here, the optical system includes the imaging optical system 120 in the example of FIG. 1, and may include the reflection unit 12 and the front windshield 13a. The column-direction pitch pi and the row-direction pitch pj of the pixel array 110pr are set to cancel the distortion in the two-dimensional plane of the optical system.

In the example of FIG. 2, there are nineteen pixel columns 110pj, and the column-direction pitch pi is substantially equal along the column direction of one pixel column 110pj. The pixels 110p are arranged at different column-direction pitches pi for each pixel column 110pj in the first to nineteenth pixel columns 110pj. Specifically, the column-direction pitch pi for each pixel column 110pj is set to gradually increase in the +α direction from the first pixel column 110pj to the tenth pixel column 110pj. The column-direction pitch pi for each pixel column 110pj is set to gradually decrease in the +α direction from the tenth pixel column 110pj to the nineteenth pixel column 110pj.

In the example of FIG. 2, there are five pixel rows 110pi, and the row-direction pitches pj are substantially equal along the row direction in each pixel row 110pi. In the first to fifth pixel rows 110pi, the pixels 110p are arranged so that the row-direction pitches pj are different for each pixel row 110pi. Specifically, the row-direction pitch pj for each pixel row 110pi is set to gradually increase in the +β direction from the first pixel row 110pi to the third pixel row 110pi. The row-direction pitch pj for each pixel row 110pi is set to gradually decrease in the +β direction from the third pixel row 110pi to the fifth pixel row 110pi.

Zigzagging lines MP1 and MP2 connect the centers C1 of the pixels 110p of the pixel array 110pr included in the outermost pixel rows 110pi. Zigzagging lines MP3 and MP4 connect the centers C1 of the pixels 110p of the pixel array 110pr included in the outermost pixel columns 110pj. The shape formed by connecting the zigzagging lines MP1 to MP4 is a barrel shape that is outwardly convex. That is, an angle θ1 between the zigzagging line MP1 and the zigzagging line MP3 is greater than 90°, and an angle θ2 between the zigzagging line MP1 and the zigzagging line MP4 is greater than 90°. An angle θ3 between the zigzagging line MP2 and the zigzagging line MP3 is greater than 90°, and an angle θ4 between the zigzagging line MP2 and the zigzagging line MP4 is greater than 90°. That is, the shape that surrounds the zigzagging lines MP1 to MP4 is not rectangular.

Figure 3A:
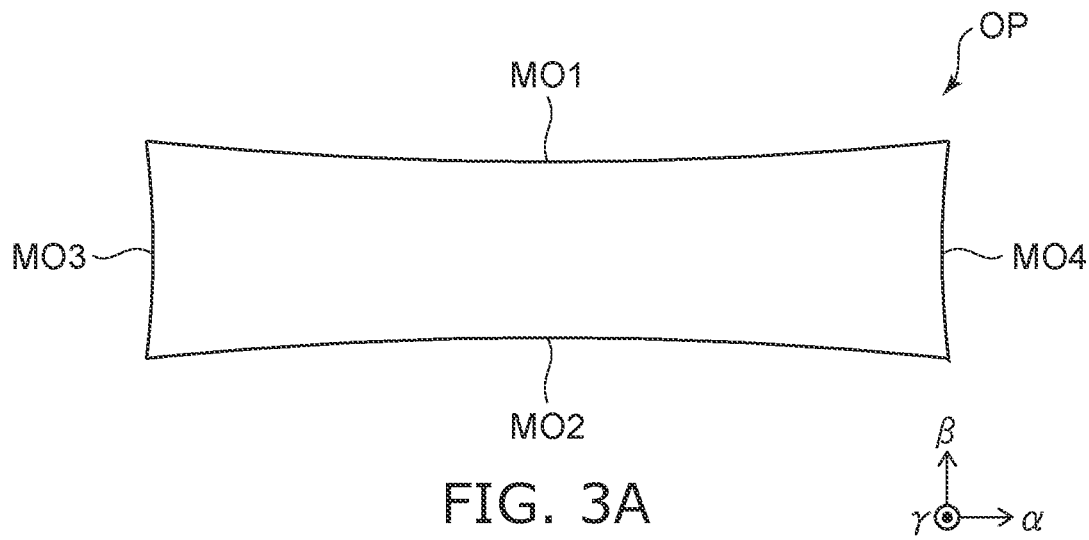
FIG. 3A is a schematic view showing distortion of an optical system of the image display device according to the first embodiment.

FIG. 3A is a schematic view showing the distortion of the optical system of the image display device according to the first embodiment.

Figure 3B:
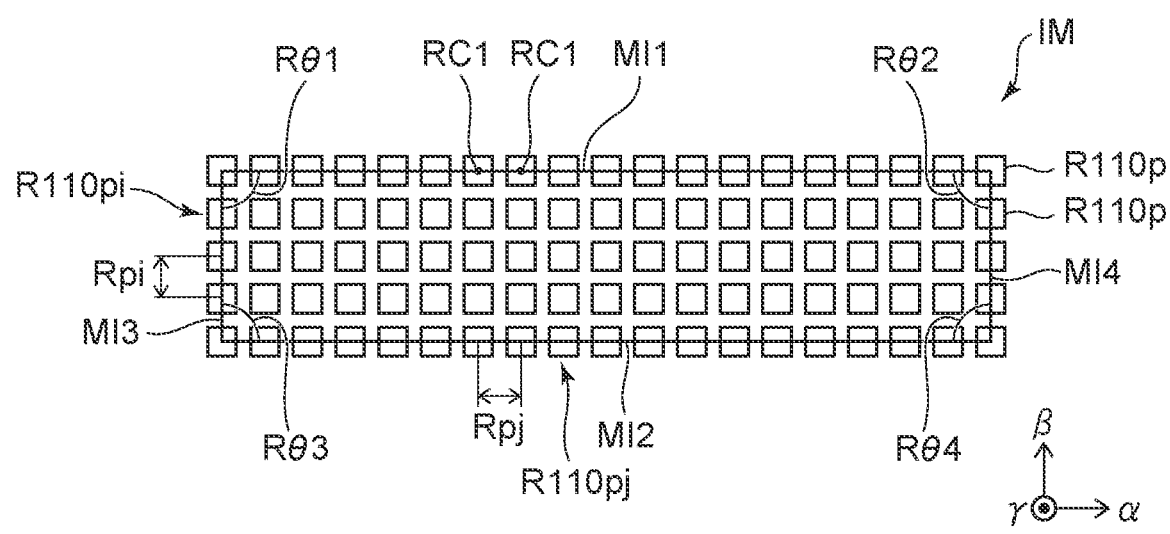
FIG. 3B is a schematic view of a first image formed by the image display device according to the first embodiment at a two-dimensional plane.

FIG. 3B is a schematic view of a first image formed by the image display device according to the first embodiment at a two-dimensional plane.

The example shown in FIG. 2 is the pixel array 110*pr* that cancels the distortion of the optical system shown in FIG. 3A.

FIG. 3A shows the shape of an emitted light OP emitted by the optical system at a two-dimensional plane when rectangular incident light is incident. The region that is surrounded with curves MO1 to MO4 is the shape when irradiated on a plane. The curves MO1 and MO2 are positioned to face each other, and the curves MO3 and MO4 are positioned to face each other. Here, the curves MO1 and MO2 of the emitted light OP correspond respectively to the zigzagging lines MP1 and MP2 of FIG. 2, and the curves MO3 and MO4 correspond respectively to the zigzagging lines MP3 and MP4 of FIG. 2. As in FIG. 2, the α-axis, the β-axis, and the γ-axis are shown in FIG. 3A to illustrate the correspondence.

In the emitted light OP of the optical system, the curve MO1 is convex in the −β direction, the curve MO2 is convex in the +β direction, the curve MO3 is convex in the +α direction, and the curve MO4 is convex in the −α direction.

A first image IM shown in FIG. 3B schematically shows a state in which the light emission of the pixels 110*p* of the pixel array 110*pr* shown in FIG. 2 form a first image at the two-dimensional plane via the optical system shown in FIG. 3A. The first image IM is formed of first images R110*p* of the multiple pixels 110*p*. Although the first image R110*p* of the pixel 110*p* has the same shape as the pixel 110*p* for the description of the correspondence with the pixel 110*p* shown in FIG. 2, the shape is not limited thereto. The α-axis, the β-axis, and the γ-axis are shown in FIG. 3B to illustrate the correspondence between the pixels 110*p* shown in FIG. 2 and the first images R110*p* of the pixels 110*p*.

The pixels 110*p* of the pixel array 110*pr* of the display device 110 shown in FIG. 2 emit light, and the light that is emitted forms the first image IM via the optical system emitting the emitted light OP shown in FIG. 3A.

As shown in FIG. 3B, the first image IM is formed of the array of the first images R110*p* of the m rows×n columns of pixels 110*p*. Similar to the pixel rows 110*pi* and the pixel columns 110*pj* of the pixel array 110*pr* shown in FIG. 2, the first image IM can be taken to be an array of the first images R110*p* of the m rows×n columns of pixels with rows R110*pi* of pixel first images and columns R110*pj* of pixel first images.

A pitch Rpj of the pixel first images is equal between the columns R110*pj* for the rows R110*pi* of the pixel first images. A pitch Rpi of the pixel first images is equal between the rows R110*pi* for the columns R110*pj* of the pixel first images.

Straight lines MI1 and MI2 connect centers RC1 of the pixel first images R110*p* among the array of the pixel first images R110*p* included in the outermost rows R110*pi*. Straight lines MI3 and MI4 connect the centers RC1 of the pixel first images R110*p* among the array of the pixel first images R110*p* included in the outermost columns R110*pj*. An angle Rθ1 between the straight lines MI1 and MI3 is 90°, and an angle Rθ2 between the straight lines MI1 and MI4 is 90°. An angle Rθ3 between the straight lines MI2 and MI3 is 90°, and an angle Rθ4 between the straight lines MP2 and MP4 is 90°. That is, the shape formed by connecting the straight lines MI1 to MI4 is rectangular.

Modifications

The array of the multiple pixels 110*p* is appropriately set according to the two-dimensional distortion of the optical system. Modifications of the pixel array will now be described.

FIGS. 4A to 6 are plan views illustrating display devices of image display devices according to modifications of the first embodiment.

Figure 4A:
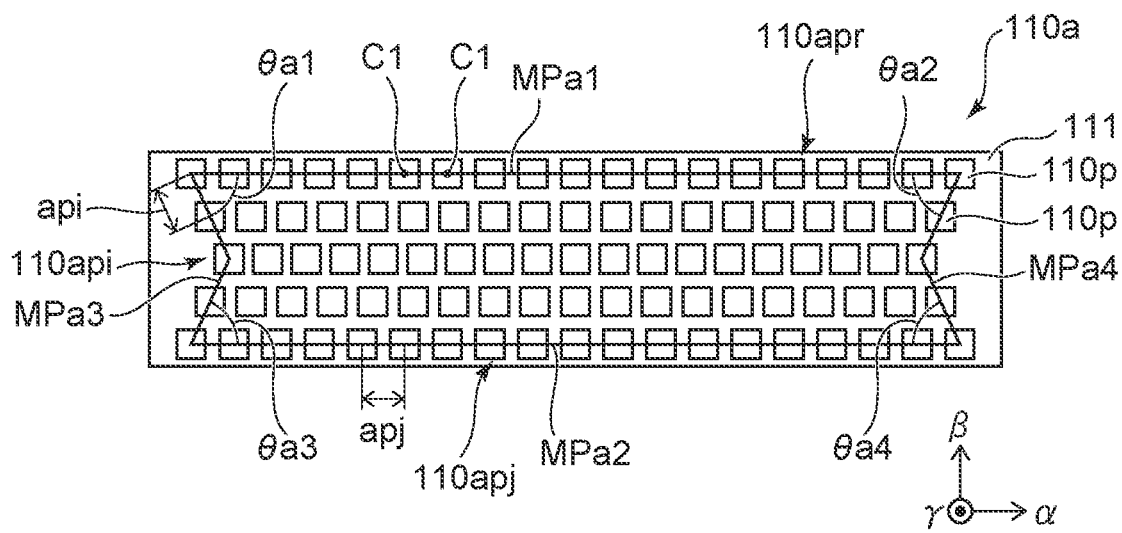
FIG. 4A is a schematic plan view illustrating a display device of an image display device according to a modification of the first embodiment.

As shown in FIG. 4A, a display device 110*a* of the modification includes a pixel array 110*apr* including the multiple pixels 110*p*. The pixel array 110*apr* includes five pixel rows 110*api* and nineteen pixel columns 110*apj*.

Specifically, the column-direction pitch api for each pixel column 110*apj* is set to gradually decrease in the +α direction from the first pixel column 110*apj* to the tenth pixel column 110*apj*. The column-direction pitch api for each pixel column 110*apj* is set to gradually increase in the +α direction from the tenth pixel column 110*apj* to the nineteenth pixel column 110*apj*.

A row-direction pitch apj for each pixel row 110*api* is set to gradually decrease in the +β direction from the first pixel row 110*api* to the third pixel row 110*api*. The row-direction pitch apj for each pixel row 110*api* is set to gradually increase in the +β direction from the third pixel row 110*api* to the fifth pixel row 110*api*.

In the example shown in FIG. 4A, the pixels 110*p* included in all of the pixel rows 110*api* are arranged to be parallel to the α-axis. Straight lines MPa1 and MPa2 connect the centers C1 of the outermost pixels 110*p* among the pixel rows 110*api*. The pixels 110*p* included in the pixel columns 110*apj* are arranged to be bent with respect to the β-axis. Zigzagging lines MPa3 and MPa4 connect the centers C1 of the outermost pixels 110*p* among the pixel columns 110*apj*. The zigzagging line MPa3 is bent to be convex in the +α direction at substantially the β-direction center of the display device 110*a*, and is a straight line before and after the bend. The zigzagging line MPa4 is bent to be convex in the −α direction at substantially the β-direction center of the display device 110*a*, and is a straight line before and after the bend.

An angle θa1 between the lines MPa1 and MPa3 is less than 90°, and an angle θa2 between the lines MPa1 and MPa4 is less than 90°. An angle θa3 between the lines MPa2 and MPa3 is less than 90°, and an angle θa4 between the lines MPa2 and MPa4 is less than 90°. The figure of which the outer edges are formed of the straight lines MPa1 and MPa2 and the zigzagging lines MPa3 and MPb4 is hexagonal and not rectangular. A sufficient number of pixels is provided in the pixel array to obtain the desired image definition. Therefore, the zigzagging line MPa3 may be considered to be a line curved to be convex in the +α direction, and the zigzagging line MPa4 may be considered to be a line curved to be convex in the −α direction. According to the other modifications described below as well, the outer perimeter shapes may be considered to be formed of curved lines.

Figure 4B:
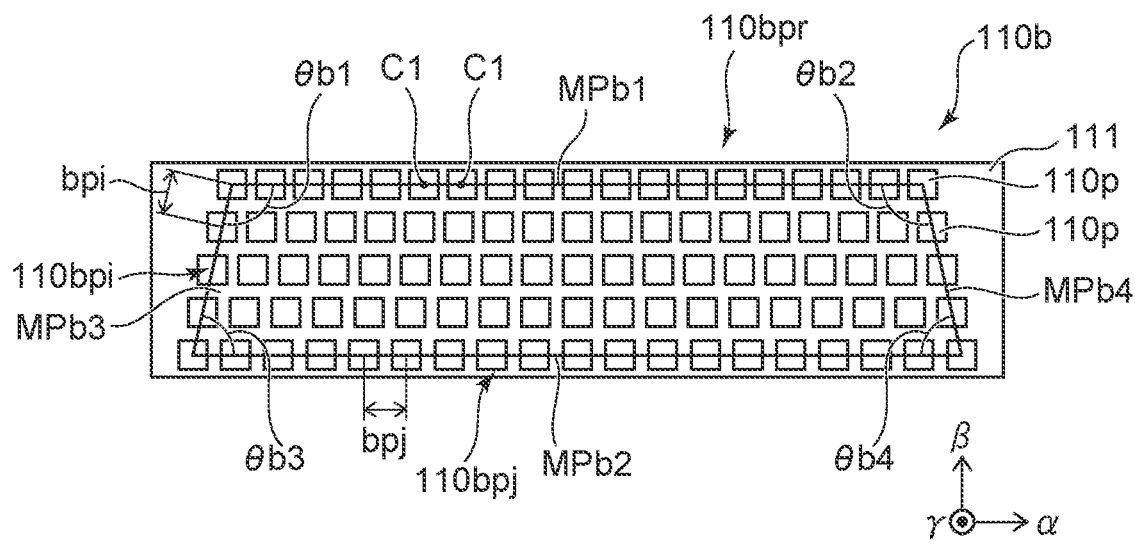
FIG. 4B is a schematic plan view illustrating a display device of an image display device according to a modification of the first embodiment.

As shown in FIG. 4B, a display device 110*b* of the modification includes a pixel array 110*bpr* including the multiple pixels 110*p*. The pixel array 110*bpr* includes five pixel rows 110*bpi* and nineteen pixel columns 110*bpj*.

Specifically, the column-direction pitch bpi for each pixel column 110*bpj* gradually decreases in the +α direction from the first pixel column 110*bpj* to the tenth pixel column 110*bpj*. The column-direction pitch bpi for each pixel column 110*bpj* gradually increases in the +α direction from the tenth pixel column 110*bpj* to the nineteenth pixel column 110*bpj*.

The row-direction pitch bpj for each pixel row 110*bpi* gradually decreases in the +β direction from the first pixel row 110*bpi* to the fifth pixel row 110*bpi*.

In the example shown in FIG. 4B, the pixels 110*p* included in all of the pixel rows 110*bpi* are arranged to be parallel to the α-axis. Straight lines MPb1 and MPb2 connect the centers C1 of the outermost pixels 110*p* of the pixel rows 110*bpi*. The pixels 110*p* included in all of the pixel columns 110*bpj* are arranged in straight lines. Straight lines MPb3 and MPb4 connect the centers of the outermost pixels 110*p* of the pixel columns 110*bpj*.

An angle θb1 between the straight lines MPb1 and MPb3 is greater than 90°, and an angle θb2 between the straight lines MPb1 and MPb4 is greater than 90°. An angle θb3 between the straight lines MPb2 and MPb3 is less than 90°, and an angle θb4 between the straight lines MPb2 and MPb4 is less than 90°. The figure of which the straight lines MPb1 to MPb4 form the outer edges is trapezoidal and not rectangular.

Figure 5A:
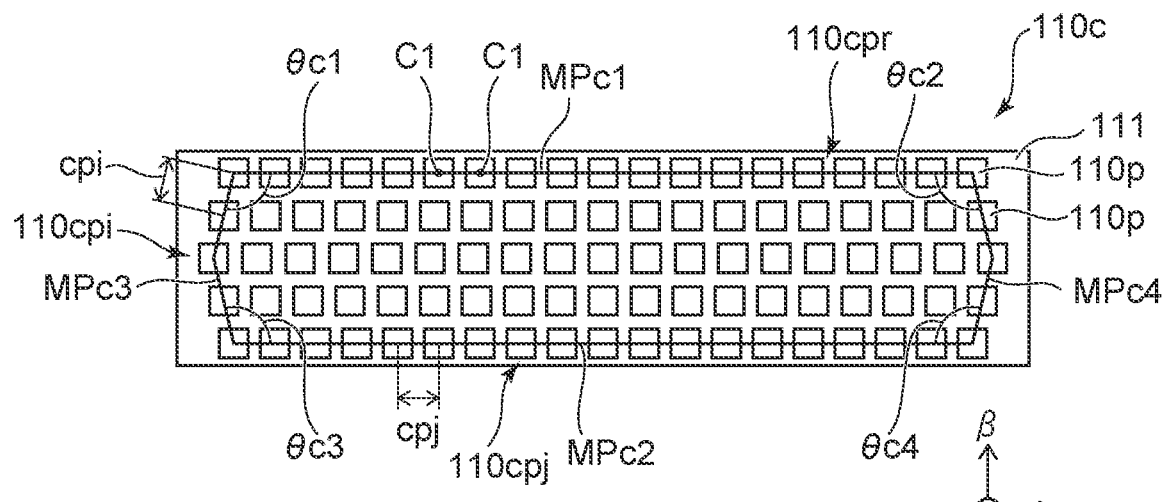
FIG. 5A is a schematic plan view illustrating a display device of an image display device according to a modification of the first embodiment.

As shown in FIG. 5A, a display device 110*c* of the modification includes a pixel array 110*cpr* including the multiple pixels 110*p*. The pixel array 110*cpr* includes five pixel rows 110*cpi* and nineteen pixel columns 110*cpj*.

Specifically, the column-direction pitch cpi for each pixel column 110*cpj* is set to gradually decrease in the +α direction from the first pixel column 110*cpj* to the tenth pixel column 110*cpj*. The column-direction pitch cpi for each pixel column 110*cpj* is set to gradually increase in the +α direction from the tenth pixel column 110*cpj* to the nineteenth pixel column 110*cpj*.

A row-direction pitch cpj for each pixel row 110*cpi* is set to gradually increase in the +β direction from the first pixel row 110*cpi* to the third pixel row 110*cpi*. The row-direction pitch cpj for each pixel row 110*cpi* is set to gradually decrease in the +β direction from the third pixel row 110*cpi* to the fifth pixel row 110*cpi*.

In the example shown in FIG. 5A, the pixels 110*p* included in all of the pixel rows 110*cpi* are arranged in straight lines parallel to the α-axis. Straight lines MPc1 and MPc2 connect the centers C1 of the outermost pixels 110*p* of the pixel rows 110*cpi*. The pixels 110*p* included in all of the pixel columns 110*cpj* are arranged in straight lines. Zigzagging lines MPc3 and MPc4 connect the centers C1 of the outermost pixels 110*p* of the pixel columns 110*cpj*.

The figure of which the lines MPc1 to MPc4 form the outer edges is hexagonal and not rectangular. An angle θc1 between the lines MPc1 and MPc3 is greater than 90°, and an angle θc2 between the lines MPc1 and MPc4 is greater than 90°. An angle θc3 between the lines MPc2 and MPc3 is greater than 90°, and an angle θc4 between the lines MPc2 and MPc4 is greater than 90°.

Figure 5B:
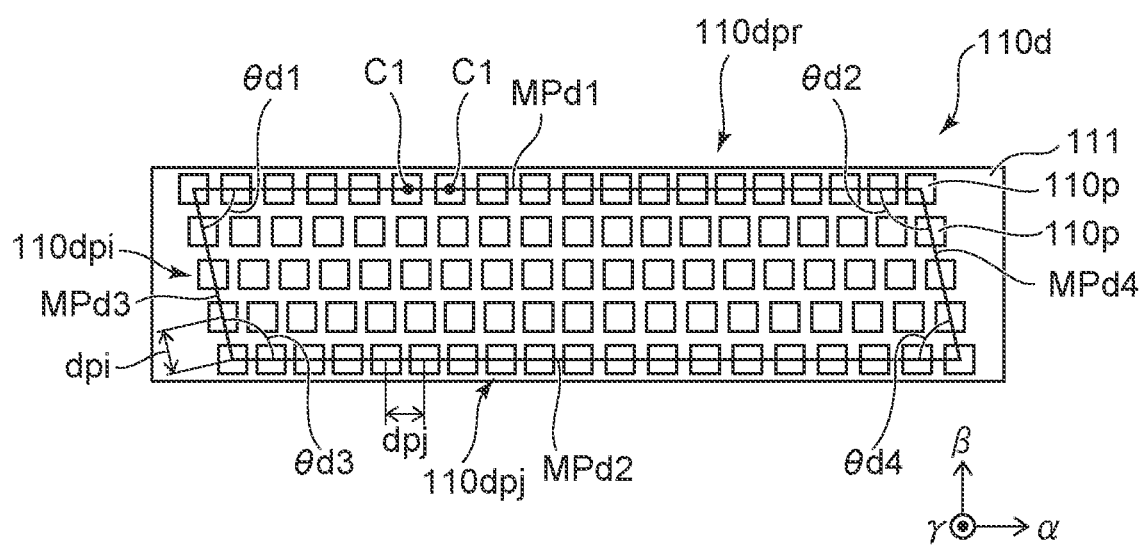
FIG. 5B is a schematic plan view illustrating a display device of an image display device according to a modification of the first embodiment.

As shown in FIG. 5B, a display device 110*d* of the modification includes a pixel array 110*dpr* including the multiple pixels 110*p*. The pixel array 110*dpr* includes five pixel rows 110*dpi* and nineteen pixel columns 110*dpj*.

Specifically, the column-direction pitch dpi is equal between all of the pixel columns 110*dpj* from the first pixel column 110*dpj* to the nineteenth pixel column 110*dpj*.

The row-direction pitch dpj is equal between all of the pixel rows 110*dpi* for the first to fifth pixel rows 110*dpi*.

In the example shown in FIG. 5B, the pixels 110*p* included in all of the pixel rows 110*dpi* are arranged in straight lines parallel to the α-axis. Straight lines MPd1 and MPd2 connect the centers C1 of the outermost pixels 110*p* of the pixel rows 110*dpi*. The pixels 110*p* included in the pixel columns 110*dpj* are arranged in straight lines at an angle from the β-axis. Straight lines MPd3 and MPd4 connect the centers of the outermost pixels 110*p* of the pixel columns 110*dpj*.

The figure of which the straight lines MPd1 to MPd4 form the outer edges is parallelogram-shaped and not rectangular. An angle θd1 between the straight lines MPd1 and MPd3 is less than 90°, and an angle θd2 between the straight lines MPd1 and MPd4 is greater than 90°. An angle θd3 between the straight lines MPd2 and MPd3 is greater than 90°, and an angle θd4 between the straight lines MPd2 and MPd4 is less than 90°.

Figure 6:
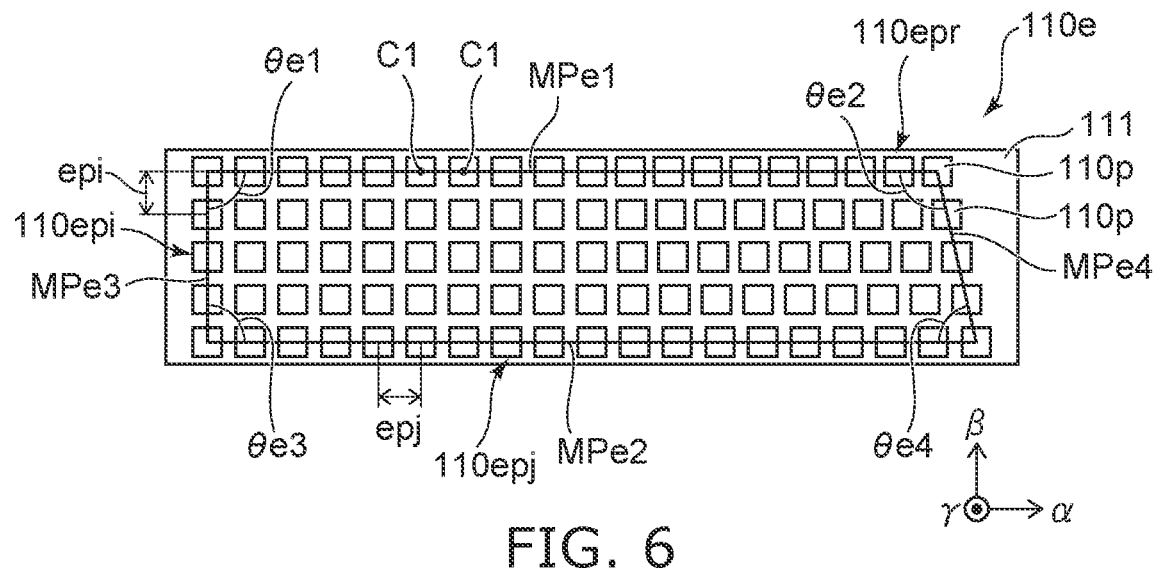
FIG. 6 is a schematic plan view illustrating a display device of an image display device according to a modification of the first embodiment.

As shown in FIG. 6, a display device 110*e* of the modification includes a pixel array 110*epr* including the multiple pixels 110*p*. The pixel array 110*epr* includes five pixel rows 110*epi* and nineteen pixel columns 110*epj*.

Specifically, a column-direction pitch epi for each pixel column 110*epj* is set to gradually increase from the first pixel column 110*epj* to the nineteenth pixel column 110*epj*.

The row-direction pitch epj for each pixel row 110*epi* is set to gradually increase from the first pixel row 110*epi* toward the fifth pixel row 110*epi*.

In the example shown in FIG. 6, the pixels 110*p* included in all of the pixel rows 110*epi* are arranged in straight lines parallel to the α-axis. Straight lines MPe1 and MPe2 connect the centers C1 of the outermost pixels 110*p* of the pixel rows 110*epi*. The pixels 110*p* included in all of the pixel columns 110*epj* are arranged in straight lines. Straight lines MPe3 and MPe4 connect the centers of the outermost pixels 110*p* of the pixel columns 110*epj*.

An angle θe1 between the straight lines MPe1 and MPe3 is 90°, and an angle θe2 between the straight lines MPe1 and MPe4 is greater than 90°. An angle θe3 between the straight lines MPe2 and MPe3 is 90°, and an angle θe4 between the straight lines MPe2 and MPe4 is less than 90°. That is, the figure of which the straight lines MPe1 to MPe4 form the outer edges is trapezoidal and not rectangular.

Pixel arrays may be formed by interchanging the pixel rows and pixel columns of the specific examples shown in FIGS. 4A to 6. Although the figures formed by the lines connecting the centers of the pixels at the outermost perimeters in the examples of FIGS. 4A to 6 each are polygons surrounded with straight lines, any shape may be used as long as the pitches for each pixel column and pixel row are set to be uniform so that the region surrounded with the figure emits uniform light. For example, the sides of the parallelogram of FIG. 5B may be curved inward to be convex into the page or may be curved outward to be convex out of the page.

As described above, the pixels 110*p* of the display device include the pixel array 110*pr* arranged in a matrix configuration of m rows×n columns. The pixel array 110*pr* in which the pixels are arranged at the row pitch and the column pitch described above means that the pixels 110*p* are uniformly arranged inside the figure formed by connecting the centers C1 of the outermost pixels 110*p*. The multiple pixels 110*p* being uniformly arranged inside the figure formed by connecting the centers C1 of the pixels 110*p* at the outermost perimeter means that the figure formed by connecting the centers C1 of the pixels 110*p* at the outermost perimeter emits substantially uniform light when the multiple pixels 110*p* emit light of substantially the same brightness. As a result, the display device can cancel the distortion of the optical system and form a first image with low distortion when the light emitted from the pixels 110p is transmitted by an optical system having two-dimensional distortion.

The detailed configuration of the display device 110 will now be described.

Figure 7:
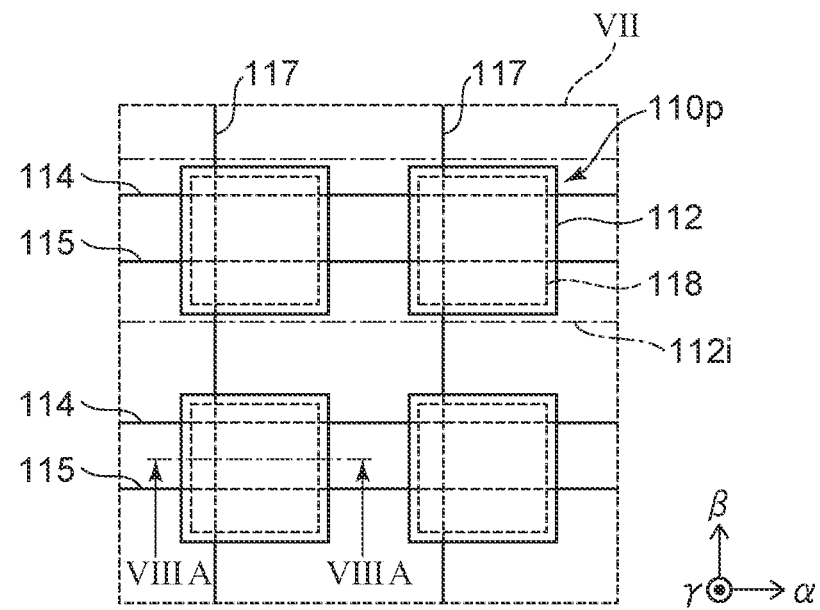
FIG. 7 is an enlarged schematic view showing a portion surrounded with broken line VII in FIG. 2.
Figure 8A:
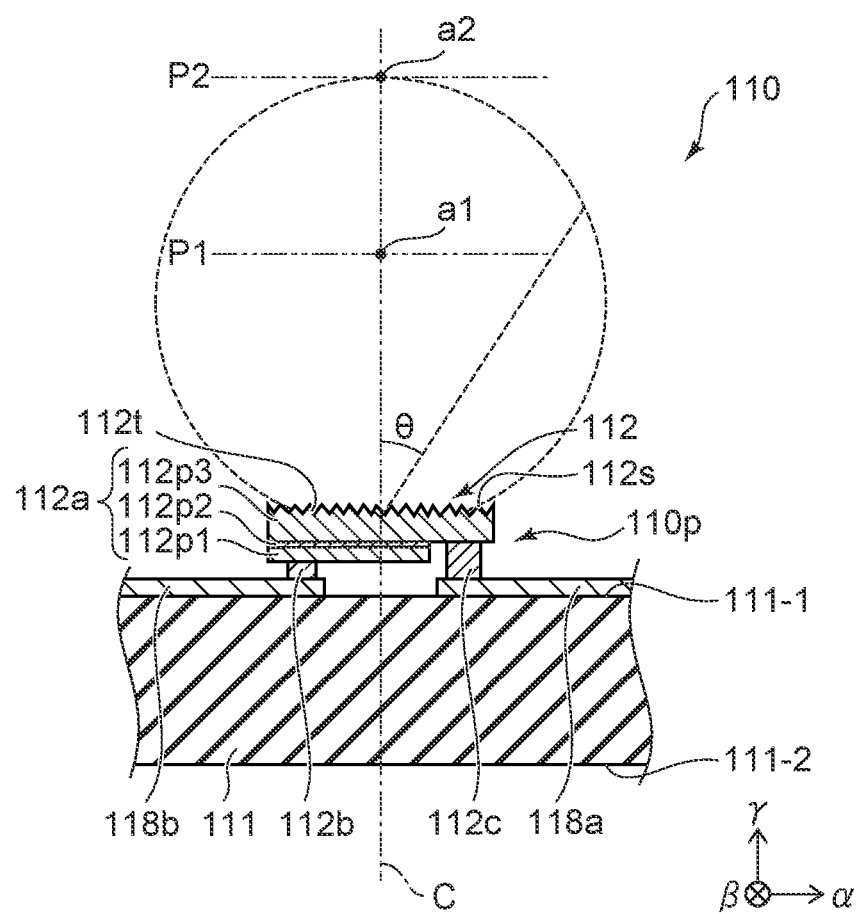
FIG. 8A is a schematic cross-sectional view along line VIIIA-VIIIA of FIG. 7.

As shown in FIGS. 7 and 8A, the display device 110 includes, for example, the substrate 111, the multiple LED elements 112, multiple scanning lines 114, multiple lighting control lines 115, multiple signal lines 117, and multiple individual circuits 118. FIG. 7 simply shows the individual circuit 118 as a quadrilateral.

For example, the substrate 111 has a flat plate shape. The substrate 111 can include, for example, glass, a resin such as polyimide, etc. As shown in FIG. 7, the multiple LED elements 112 are arranged in a matrix configuration on the substrate 111. Hereinbelow, the multiple LED elements 112 arranged in one row in the α-direction are called a "row 112i."

For example, each LED element 112 is mounted face-down on the substrate 111. Each LED element 112 may be mounted face-up on the substrate 111. Each LED element 112 includes a semiconductor stacked body 112a, an anode electrode 112b, and a cathode electrode 112c.

The semiconductor stacked body 112a includes a p-type semiconductor layer 112p1, an active layer 112p2 located on the p-type semiconductor layer 112p1, and an n-type semiconductor layer 112p3 located on the active layer 112p2. The semiconductor stacked body 112a includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 112 is visible light.

The anode electrode 112b is electrically connected to the p-type semiconductor layer 112p1. Also, the anode electrode 112b is electrically connected to a wiring part 118b of the individual circuit 118 described below. The cathode electrode 112c is electrically connected to the n-type semiconductor layer 112p3. Also, the cathode electrode 112c is electrically connected to another wiring part 118a of the individual circuit 118 described below. The anode electrode 112b and the cathode electrode 112c can include, for example, a metal material.

According to the embodiment, multiple recesses 112t are provided in a light-emitting surface 112s of each LED element 112. In the specification, "the light-emitting surface of the LED element" means the surface of the LED element that mainly emits the light that is incident on the imaging optical system 120. According to the embodiment, the surface of the n-type semiconductor layer 112p3 that is positioned at the side opposite to the surface facing the active layer 112p2 corresponds to the light-emitting surface 112s.

Examples of methods for providing the multiple recesses 112t in the surface of the n-type semiconductor layer 112p3 positioned at the side opposite to the surface facing the active layer 112p2 include, for example, a method in which multiple protrusions are formed in the upper surface of a growth substrate, the n-type semiconductor layer 112p3, the active layer 112p2, and the p-type semiconductor layer 112p1 are grown in this order on the growth substrate, and the n-type semiconductor layer 112p3 and the growth substrate are detached by LLO (Laser Lift Off) or the like, a method of performing surface roughening of the surface of the n-type semiconductor layer 112p3 to form the multiple recesses 112t after detaching the growth substrate, etc. Methods of surface roughening include anisotropic etching, etc.

Hereinbelow, the optical axis of the light emitted from each pixel 110p is called simply an "optical axis C." As shown in FIG. 8A, the optical axis C is, for example, a straight line that connects a point a1 in a first plane P1 and a point a2 in a second plane P2, wherein the first plane P1 is positioned at the light-emitting side of the display device 110 and is parallel to the αβ-plane in which the multiple pixels 110p are arranged, the luminance is a maximum at the point a1 in the range in which the light is irradiated from one pixel 110p, the second plane P2 is parallel to the αβ-plane and separated from the first plane P1, and the luminance is a maximum at the point a2 in the range in which the light is irradiated from the one pixel 110p. For example, if the luminance has maxima at multiple points, the center of the points may be used as the maximum luminance point. From the perspective of productivity, it is desirable for the optical axis C to be parallel to the γ-axis.

Thus, by providing the multiple recesses 112t in the light-emitting surface 112s of each LED element 112, the light that is emitted from each LED element 112, i.e., the light that is emitted from each pixel 110p, has a substantially Lambertian light distribution as shown by the broken line in FIG. 8A. "The light emitted from each pixel has a substantially Lambertian light distribution" means a light distribution pattern in which the luminous intensity in the direction of an angle θ with respect to the optical axis C of each pixel 110p can be approximated by $\cos^n \theta$ times the luminous intensity at the optical axis C, wherein n is a value greater than 0. Here, it is favorable for n to be not more than 11, and more favorably 1. Although many planes including the optical axis C of the light emitted from one pixel 110p exist, the light distribution pattern of the light emitted from the one pixel 110p has a substantially Lambertian light distribution in each plane, and the numerical values of n are substantially equal.

However, the configuration of each LED element is not limited to that described above. For example, multiple protrusions instead of multiple recesses may be provided in the light-emitting surface of each LED element, or both multiple recesses and multiple protrusions may be provided. When the growth substrate is light-transmissive, the growth substrate may not be detached from the semiconductor stacked body, and multiple recesses and/or multiple protrusions may be provided in the surface of the growth substrate corresponding to the light-emitting surface. In such configurations as well, the light that is emitted from each LED element has a substantially Lambertian light distribution. Also, in each LED element, an n-type semiconductor layer may be provided to face the substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element. As described in other embodiments described below, it is sufficient for the light finally emitted from each pixel to have a substantially Lambertian light distribution, and the light that is emitted from each LED element may not have a substantially Lambertian light distribution.

For example, the scanning lines 114, the lighting control lines 115, the signal lines 117, and the individual circuits 118 are formed by a low-temperature polysilicon (LTPS) process on the substrate 111. According to the embodiment, for example, the scanning circuit and the driver circuit that scan and drive the scanning lines 114, the lighting control lines 115, and the signal lines 117 are located in the controller. The scanning circuit and the driver circuit may be formed on the substrate of the display device by a LTPS process.

According to the embodiment, one individual circuit 118 corresponds to one LED element 112. However, multiple LED elements may be located in one pixel; in such a case, one individual circuit may correspond to the multiple LED elements in the one pixel.

Figure 8B:
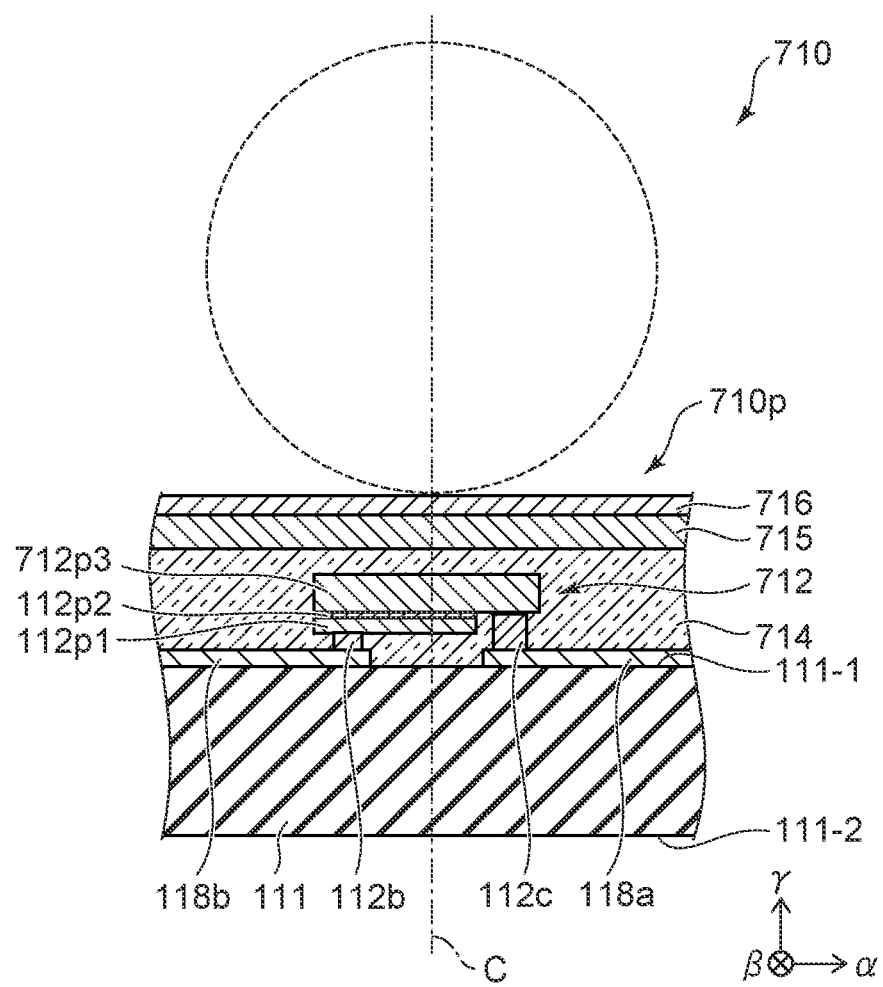
FIG. 8B is a schematic cross-sectional view showing a modification of the display device of the image display device according to the first embodiment.

FIG. 8B is a cross-sectional view showing a modification of the display device of the image display device according to the first embodiment.

A pixel 710p of the display device 710 according to the modification differs from the example shown in FIG. 8A in that the surface of an n-type semiconductor layer 712p3 positioned at the side opposite to the surface facing the active layer 112p2 is substantially flat, and a protective layer 714, a wavelength conversion member 715, and a color filter 716 are further included.

The protective layer 714 covers multiple LED elements 712 arranged in a matrix configuration. The protective layer 714 can include, for example, a light-transmitting material such as a polymer material that includes a sulfur (S)-including substituent group or a phosphorus (P) atom-including group, a high refractive index nanocomposite material in which inorganic nanoparticles having a high refractive index are introduced to a polymer matrix of polyimide, etc.

The wavelength conversion member 715 is located on the protective layer 714. The wavelength conversion member 715 includes one or more types of wavelength conversion material such as a general fluorescer material, a perovskite fluoresce material, a quantum dot (QD), etc. The light that is emitted from each LED element 712 is incident on the wavelength conversion member 715. The wavelength conversion material that is included in the wavelength conversion member 715 emits light of a different light emission peak wavelength from the light emission peak wavelength of the LED element 712 by the light emitted from the LED element 712 being incident on the wavelength conversion material. The light that is emitted by the wavelength conversion member 715 has a substantially Lambertian light distribution.

The color filter 716 is located on the wavelength conversion member 715. The color filter 716 is configured to shield the greater part of the light emitted from the LED element 712. Accordingly, the light that is emitted mainly by the wavelength conversion member 715 is emitted from each pixel 710p. Therefore, as shown by the broken line in FIG. 8B, the light that is emitted from each pixel 710p has a substantially Lambertian light distribution. When the greater part of the light emitted from the LED element 712 is absorbed by the wavelength conversion member 715, a color filter may be omitted. Thus, the light that is emitted from each pixel can have a Lambertian light distribution even when multiple recesses or protrusions are not provided in the light-emitting surface of the LED element.

According to the embodiment, the light emission peak wavelength of the LED element 712 may be in the ultraviolet region or may be in the visible light region. When blue light is to be emitted from at least one pixel 710p, for example, blue light may be emitted from the LED element 712 of such a pixel 710p; and the wavelength conversion member 715 and the color filter 716 may be omitted for this pixel 710p. In such a case, the light that is emitted from the pixel 710p may have a substantially Lambertian light distribution by providing a light-scattering member including light-scattering particles to cover the LED element 712.

Any of the display devices 110 and 710 may be included in the light source unit 11 and/or the image display device 10. In the following description, the display device 110 includes the pixel 110p unless otherwise noted.

Figure 9:
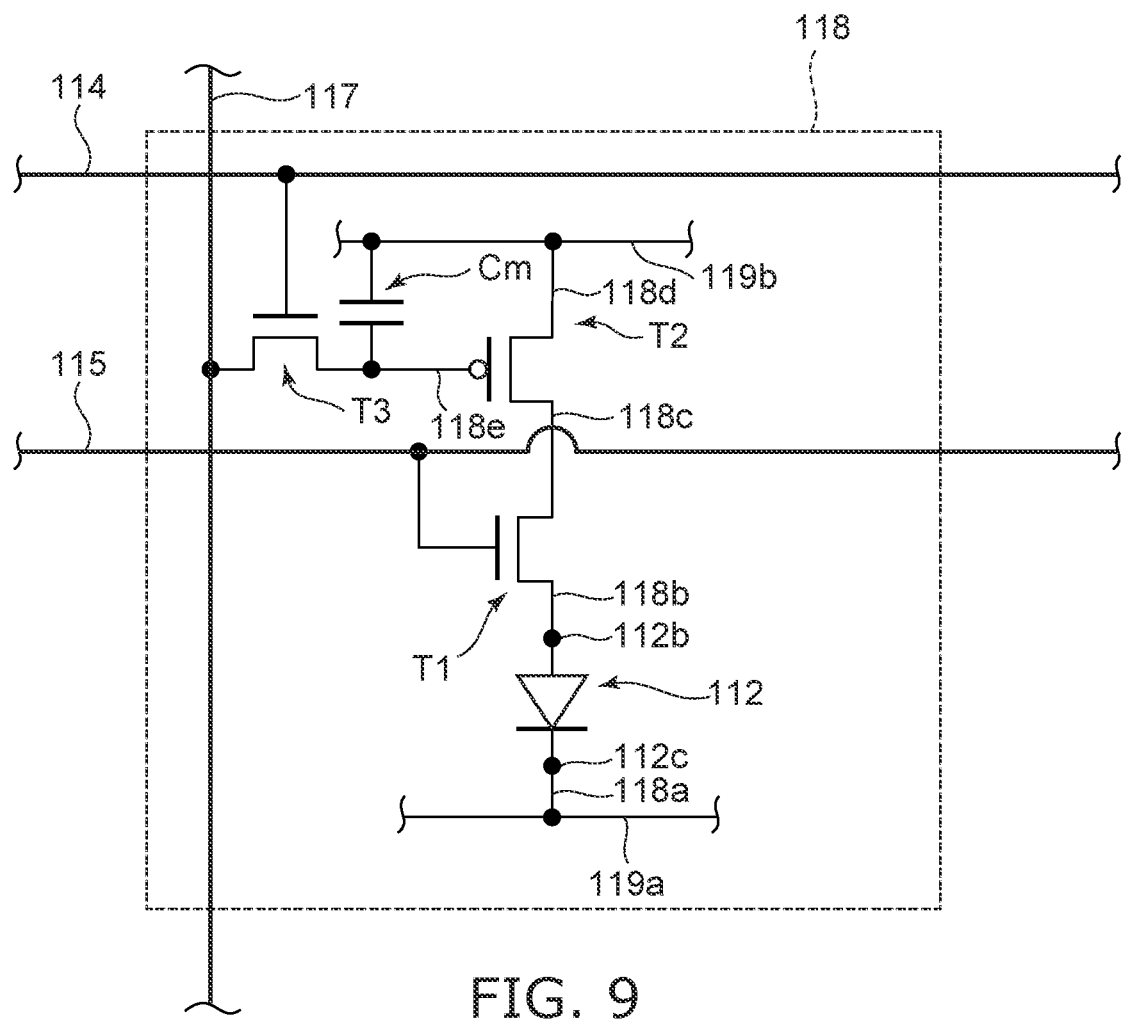
FIG. 9 is a schematic circuit diagram illustrating an individual circuit controlling an LED element of a pixel of FIG. 7.

As shown in FIG. 9, each individual circuit 118 includes a first transistor T1, a second transistor T2, a third transistor T3, a capacitor Cm, and the multiple wiring parts 118a to 118e.

As shown in FIG. 9, the cathode electrode 112c of the LED element 112 is electrically connected to a ground line 119a via the wiring part 118a. The ground line 119a is connected to a reference potential. The anode electrode 112b of the LED element 112 is electrically connected to the source electrode of the first transistor T1 via the wiring part 118b.

The gate electrode of the first transistor T1 is electrically connected to the lighting control line 115. The drain electrode of the first transistor T1 is electrically connected to the drain electrode of the second transistor T2 via a wiring part 118c. The source electrode of the second transistor T2 is electrically connected to a power supply line 119b via a wiring part 118d. The power supply line 119b is connected to a power supply (not illustrated).

The gate electrode of the second transistor T2 is electrically connected to the drain electrode of the third transistor T3 via a wiring part 118e. The source electrode of the third transistor T3 is electrically connected to the signal line 117. The gate electrode of the third transistor T3 is electrically connected to the scanning line 114.

The wiring part 118e is electrically connected to one terminal of the capacitor Cm. The other terminal of the capacitor Cm is electrically connected to the power supply line 119b.

A not-illustrated scanning circuit selects one row among the multiple rows 112i and transmits an on-signal to the scanning line 114 electrically connected to the row 112i. As a result, the third transistors T3 of the individual circuits 118 corresponding to the row 112i are in a state in which the third transistors T3 can be switched on. A not-illustrated driver circuit transmits, to the signal lines 117, drive signals corresponding to the setting outputs of the LED elements 112 belonging to the row 112i. As a result, the drive signal voltages are stored in the capacitors Cm. The drive signal voltages set the second transistors T2 of the individual circuits 118 corresponding to the row 112i to a state in which the second transistors T2 can be switched on.

The scanning circuit transmits, to the lighting control line 115 electrically connected to the row 112i, a control signal that sequentially switches the first transistors T1 of the row 112i on and off. When the first transistors T1 are in the on-state, the light emission luminances of the LED elements are controlled by currents corresponding to the drive signal voltages stored in the capacitors Cm flowing in the LED elements 112 belonging to the row 112i. The light emission periods of the LED elements 112 are controlled for each row 112i by switching the first transistors T1 on and off.

The scanning circuit sequentially switches, in the Y-direction, the scanning line 114 transmitting the on-signal and the lighting control line 115 transmitting the control signal. Accordingly, the row 112i that is driven is sequentially switched in the Y-direction.

The configuration of the individual circuit is not limited to that described above. For example, the individual circuit may include a second transistor, a third transistor, a capacitor, and wiring parts without including a first transistor. Multiple scanning lines may extend from the scanning circuit; and a lighting control line may be omitted. The scanning lines, the lighting control lines, the signal lines, the wiring parts of the individual circuits, etc., may not be on the surface of the substrate, but may instead be provided in the substrate. The electrical elements such as the transistors, capacitors, and the like included in the individual circuit may be separately manufactured and then mounted on the substrate instead of being formed on the substrate. Instead of separately manufacturing the LED elements and then mounting to the substrate, the LED elements may be formed on the substrate by using a semiconductor material such as silicon (Si) or the like as the substrate and by using a semiconductor element. The display device is not limited to an LED display and may be another display in which the emitted light has a substantially Lambertian light distribution.

The description continues now by returning to FIG. 1.

In the description of the image display device 10, an XYZ orthogonal coordinate system may be used for easier understanding of the description. Hereinbelow, the direction in which an X-axis extends is called an "X-direction," the direction in which a Y-axis extends is called a "Y-direction," and the direction in which a Z-axis extends is called a "Z-direction." According to the embodiment, an example is described in which the longitudinal direction of the vehicle 13 is along the "X-direction," the lateral direction of the vehicle 13 is along the "Y-direction," and the vertical direction of the vehicle 13 is along the "Z-direction." In other words, in the following examples, the XY-plane is the horizontal plane of the vehicle 13.

Hereinbelow, the X-direction in the direction of the arrow also is called the "+X direction," and the opposite direction also is called the "−X direction." The Y-direction in the direction of the arrow also is called the "+Y direction," and the opposite direction also is called the "−Y direction." The Z-direction in the direction of the arrow also is called the "+Z direction," and the opposite direction also is called the "−Z direction." A member A and a member B being arranged in this order in the +X direction is referred to as "the member B being positioned at the +X side of the member A" or "the member A being positioned at the −X side of the member B." This is similar for the +Y direction and the +Z direction as well. XYZ coordinates are similarly used in the descriptions associated with FIGS. 14, 15, 17, and 18.

The imaging optical system 120 of the light source unit 11 is an optical system that includes all of the optical elements necessary for forming the first image (the first image corresponding to the image) IM1 at the prescribed position. The embodiment includes an input element 121 on which the light emitted from the display device 110 is incident, and an output element 123 on which the light traveling via the input element 121 is incident. The imaging optical system 120 further includes an intermediate element 122 located between the input element 121 and the output element 123. The imaging optical system may not include an intermediate element. As shown in FIG. 1, the light emitted from the output element 123 forms the first image IM1.

The imaging optical system 120 is substantially telecentric at the first image IM1 side. Here, "the imaging optical system 120 is substantially telecentric at the first image IM1 side" means that the multiple main rays L that are emitted from mutually-different positions of the display device 110, travel via the imaging optical system 120, and reach the first image IM1 are substantially parallel to each other before and after the first image IM1 as shown in FIG. 1. "Different positions" refers to, for example, different pixels 110p. "The multiple main rays L being substantially parallel to each other" means being substantially parallel in a practical range that permits errors such as the manufacturing accuracy, assembly accuracy, etc., of the components of the light source unit 11. When "the multiple main rays L are substantially parallel to each other for example, the angle between the main rays L is not more than 10 degrees.

When the imaging optical system 120 is substantially telecentric at the first image IM1 side, the multiple main rays L cross each other before being incident on the input element 121. Hereinbelow, the point at which the multiple main rays L cross each other is called a "focal point F." Therefore, for example, whether or not the imaging optical system 120 is substantially telecentric at the first image IM1 side can be confirmed by utilizing the backward propagation of light by the following method. First, a light source that can emit parallel light such as a laser light source or the like is provided at the vicinity of the position at which the first image IM1 is formed. The light that is emitted from the light source is irradiated on the output element 123 of the imaging optical system 120. The light that is emitted from the light source and travels via the output element 123 is incident on the input element 121. Then, if the light that is emitted from the input element 121 condenses at a point, i.e., the focal point F, before reaching the display device 110, then the imaging optical system 120 can be determined to be substantially telecentric at the first image IM1 side.

Because the imaging optical system 120 is substantially telecentric at the first image IM1 side, the light emitted from each pixel 110p that is mainly incident on the imaging optical system 120 is the light that passes through the focal point F and the vicinity of the focal point F. Optical elements included in the imaging optical system 120 will now be described.

The input element 121 is positioned at the −Z side of the display device 110 and arranged to face the display device 110. The input element 121 is a mirror that includes a concave mirror surface 121a. The input element 121 reflects the light emitted from the display device 110.

The intermediate element 122 is positioned at the −X side of the display device 110 and the input element 121 and arranged to face the input element 121. The intermediate element 122 is a mirror that includes a concave mirror surface 122a. The intermediate element 122 further reflects the light reflected by the input element 121.

The input element 121 and the intermediate element 122 are included in a bending part 120a that bends the multiple main rays L so that the multiple main rays L emitted from mutually-different positions of the display device 110 are substantially parallel to each other. According to the embodiment, the mirror surfaces 121a and 122a are biconic surfaces. However, the mirror surfaces may be portions of spherical surfaces or may be freeform surfaces.

The output element 123 is positioned at the +X side of the display device 110 and the input element 121 and arranged to face the intermediate element 122. The output element 123 is a mirror that includes a flat mirror surface 123a. The output element 123 reflects the light traveling via the input element 121 and the intermediate element 122 toward the formation position of the first image IM1. Specifically, the multiple main rays L that are substantially parallel due to the bending part 120a are incident on the output element 123. The mirror surface 123a is tilted in the −Z/+X direction with respect to the XY-plane, i.e., the horizontal plane of the vehicle 13. As a result, the light that is reflected by the intermediate element 122 is reflected by the output element 123 in a direction tilted in the −Z/+X direction with respect to the Z-direction. Thus, as shown in FIG. 1, the output element 123 is included in a direction modifying part 120b that modifies the directions of the multiple main rays L caused to be substantially parallel by the bending part 120a so that the multiple main rays L are directed toward a formation position P of the first image IM1.

According to the embodiment, the optical path between the input element 121 and the intermediate element 122 extends in a direction crossing the XY-plane. The optical path between the intermediate element 122 and the output element 123 extends in a direction along the XY-plane. Because a portion of the optical path inside the imaging optical system 120 extends in a direction crossing the XY-plane, the light source unit 11 can be somewhat smaller in directions along the XY-plane. Also, because another portion of the optical path inside the imaging optical system 120 extends in a direction along the XY-plane, the light source unit 11 can be somewhat smaller in the Z-direction.

The optical path between the display device 110 and the input element 121 crosses the optical path between the intermediate element 122 and the output element 123. Thus, by causing the optical paths to cross each other inside the light source unit 11, the light source unit 11 can be smaller.

The optical paths inside the light source unit are not limited to those described above. For example, all of the optical paths inside the imaging optical system may extend in directions along the XY-plane or may extend in directions crossing the XY-plane. The optical paths inside the light source unit may not cross each other.

The input element 121, the intermediate element 122, and the output element 123 each may include a main member made of glass, a resin material, or the like and a reflective film such as a metal film, a dielectric multilayer film, or the like forming the mirror surfaces 121a, 122a, and 123a located at the surface of the main member. The input element 121, the intermediate element 122, and the output element 123 each may be entirely formed of a metal material.

According to the embodiment as shown in FIG. 1, the light source unit 11 is located at a ceiling part 13b of the vehicle 13. For example, the light source unit 11 is located at the inner side of a wall 13s1 of the ceiling part 13b exposed inside the vehicle. A through-hole 13h1 through which the light emitted from the output element 123 of the light source unit 11 can pass is provided in the wall 13s1. The light that is emitted from the output element 123 passes through the through-hole 13h1 and is irradiated on the space between the user 14 and the front windshield 13a. The light source unit may be mounted to the ceiling surface. A transparent or semi-transparent cover may be located in the through-hole 13h1. It is favorable for the haze value of the cover of the through-hole 13h1 to be not more than 50%, and more favorably not more than 20%.

Although the imaging optical system 120 is described above, the configuration and position of the coupling optical system are not limited to those described above as long as the coupling optical system is substantially telecentric at the first image side. For example, the number of optical elements included in the direction modifying part may be two or more.

The reflection unit 12 will now be described.

According to the embodiment, the reflection unit 12 includes a mirror 131 that includes a concave mirror surface 131a. According to the embodiment, the mirror surface 131a is a biconic surface. However, the mirror surface may be a portion of a spherical surface or may be a freeform surface. As shown in FIG. 1, the mirror 131 is arranged to face the front windshield 13a. The mirror 131 reflects the light emitted from the output element 123 and irradiates the light on the front windshield 13a. The light that is irradiated on the front windshield 13a is reflected by the inner surface of the front windshield 13a and enters the eyebox 14a of the user 14. As a result, the user 14 views the second image IM2 corresponding to the image displayed by the display device 110 at the +X side of the front windshield 13a.

The mirror 131 may include a main member made of glass, a resin material, or the like and a reflective film such as a metal film, a dielectric multilayer film, or the like forming the mirror surface 131a located at the surface of the main member. The mirror 131 may be entirely formed of a metal material.

According to the embodiment, the reflection unit 12 is located at a dashboard part 13c of the vehicle 13. For example, the reflection unit 12 is located at the inner side of a wall 13s2 of the dashboard part 13c of the vehicle 13 exposed inside the vehicle. A through-hole 13h2 through which the light emitted from the output element 123 of the light source unit 11 can pass is provided in the wall 13s2. The light that is emitted from the output element 123 passes through the through-hole 13h1, forms the first image IM1, subsequently passes through the through-hole 13h2, and is irradiated on the reflection unit 12. The reflection unit may be mounted to the upper surface of the dashboard part. The reflection unit may be located at the ceiling part, and the light source unit may be located at the dashboard part.

As shown in FIG. 1, the light that travels from the inner surface of the front windshield 13a toward the eyebox 14a is positioned at the XY-plane. Here, "the light that travels from the inner surface of the front windshield 13a toward the eyebox 14a is positioned at the XY-plane" means that a portion of the light traveling from the inner surface of the front windshield 13a toward the eyebox 14a is positioned at the XY-plane. With this XY-plane as a boundary, the light source unit 11 is located in a region at the +Z side. In other words, the light source unit 11 is separated in the +Z direction from the XY-plane. Also, with the plane XY as a boundary, the reflection unit 12 is located in a region at the −Z side. In other words, the reflection unit 12 is separated in the −Z direction from the XY-plane. The arrangement of the light source unit and the reflection unit is not limited to that described above.

Thus, the configuration and position of the reflection unit are not limited to those described above for the reflection unit 12. For example, the number of optical elements such as mirrors and the like included in the reflection unit may be two or more. It goes without saying that the reflection unit 12 must be arranged so that, for example, sunlight that is irradiated from outside the vehicle via the front windshield 13a is not reflected toward the eyebox 14a.

Effects of the image display device 10 according to the embodiment will now be described.

In the light source unit 11 of the image display device 10 according to the embodiment, the imaging optical system 120 is substantially telecentric at the first image IM1 side, and the light that is emitted from the display device 110 has a substantially Lambertian light distribution. Therefore, the quality of the first image IM1 can be improved while downscaling the light source unit 11. More specifically, because the light emitted from the display device 110 has a substantially Lambertian light distribution, the dependence on the angle of the luminous intensity and/or chromaticity of the light emitted from each pixel 110p of the display device 110 can be reduced.

As an exact Lambertian light distribution is approached, that is, as the approximation formula of the light distribution pattern approaches $\cos^n\theta$ in which n is 1, the luminous intensity and/or chromaticity of the light emitted from each pixel 110p of the display device 110 is substantially uniform regardless of the angle. Therefore, fluctuation of the luminance and/or chromaticity of the first image IM1 can be suppressed, and the quality of the first image IM1 can be improved.

Because the imaging optical system 120 forms the first image IM1 mainly with light passing through the focal point F, an increase of the light diameter of the light incident on the imaging optical system 120 can be suppressed. The input element 121 can be smaller thereby. Furthermore, the multiple main rays L that are emitted from the output element 123 are substantially parallel to each other. The multiple main rays L emitted from the output element 123 being substantially parallel to each other means that the range in which the light of the output element 123 contributing to the floating image formation is irradiated is substantially the same as the size of the first image IM1. Therefore, the output element 123 of the imaging optical system 120 also can be smaller. Thus, the light source unit 11 that is small and can form a high-quality first image IM1 can be provided.

The image display device 10 according to the embodiment includes the light source unit 11, and the reflection unit 12 that is separated from the light source unit 11 and reflects the light emitted from the imaging optical system 120. The first image IM1 is formed between the light source unit 11 and the reflection unit 12. In such a case, the light that is emitted from one point of the display device 110 travels via the output element 123 and then is condensed at the formation position of the first image IM1. On the other hand, when the first image IM1 is not formed between the light source unit 11 and the reflection unit 12, the light diameter of the light emitted from one point of the display device 110 gradually spreads from the input element 121 toward the reflection unit 12. Accordingly, according to the embodiment, the irradiation area on the output element 123 of the light emitted from the one point of the display device 110 can be less than when the first image IM1 is not formed. Therefore, the output element 123 can be smaller.

Because the light source unit 11 according to the embodiment is small, the light source unit 11 can be easily located in the limited space inside the vehicle 13 when the light source unit 11 is mounted in the vehicle 13 and used as a head-up display.

In the light source unit 11 and the image display device 10 according to the embodiment, the multiple pixels 110p of the display device 110 are arranged in a matrix configuration to cancel the two-dimensional distortion of the optical system. More specifically, in the pixel array 110pr which is an array of the multiple pixels 110p, the multiple pixels 110p are arranged to be uniform inside a shape having outer edges formed by zigzagging lines, curved lines, and straight lines formed of line segments connecting the centers C1 of the outermost pixels 110p.

As described above, the light source unit 11 and/or image display device 10 according to the embodiment includes the imaging optical system 120, the mirror 131 of the reflection unit 12, etc., as the optical system. Various optical parameters of the optical system are set according to the dimensions, arrangement, etc., of the light source unit 11 and/or the components of the vehicle 13 in which the image display device 10 is mounted. Because the light emitted from the display device 110 forms an image via the optical system, when two-dimensional distortion occurs in the optical system, the image can be formed at the two-dimensional plane without distortion by setting the various pixel arrays 110pr to 110epr, etc., including the modifications described above to cancel the two-dimensional distortion of the optical system.

According to the embodiment, the imaging optical system 120 includes the bending part 120a and the direction modifying part 120b. Thus, the design of the imaging optical system 120 is easier because the part of the imaging optical system 120 having the function of making the main rays L parallel to each other and the part of the imaging optical system 120 forming the first image IM1 at the desired position are separate.

A portion of the optical path inside the imaging optical system 120 extends in a direction crossing the XY-plane orthogonal to the Z-direction. Therefore, the imaging optical system 120 can be somewhat smaller in directions along the XY-plane.

Another portion of the optical path inside the imaging optical system 120 extends in directions along the XY-plane orthogonal to the Z-direction. Therefore, the imaging optical system 120 can be somewhat smaller in the Z-direction.

Second Embodiment

Figure 10A:
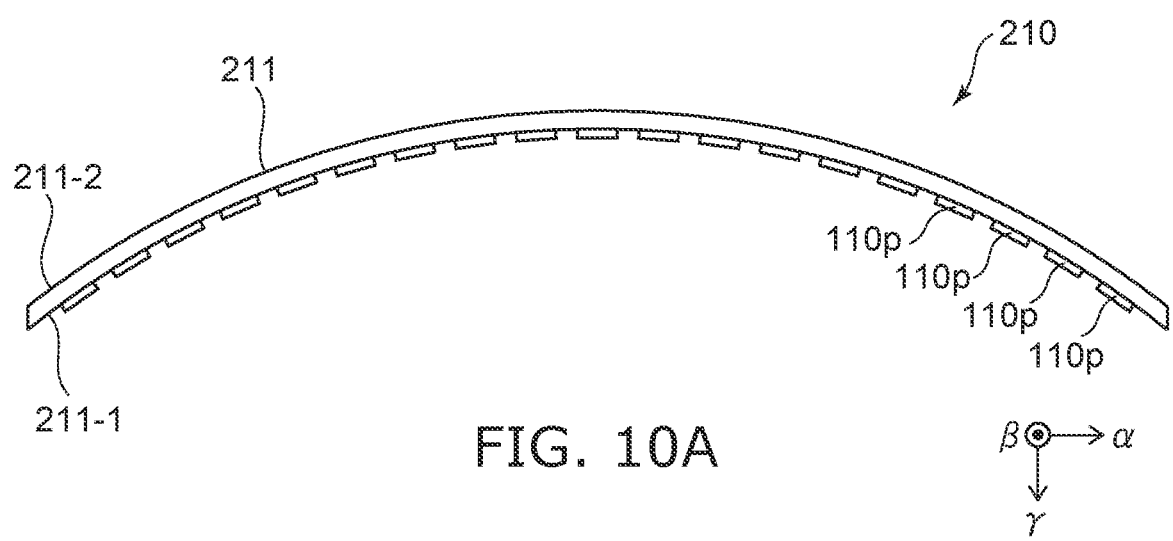
FIG. 10A is a schematic side view illustrating a display device of an image display device according to a second embodiment.

FIG. 10A is a side view illustrating a display device of an image display device according to a second embodiment.

Figure 10B:
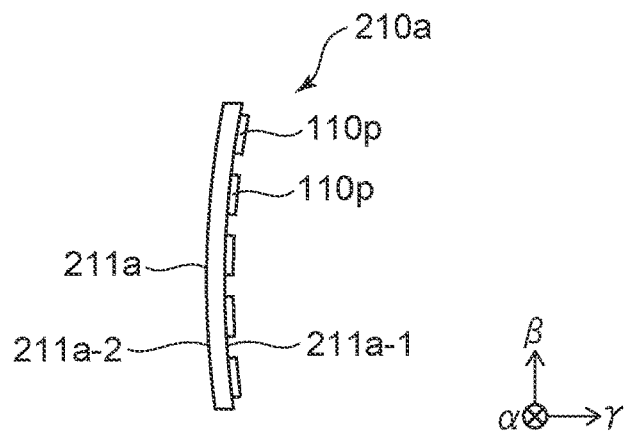
FIG. 10B is a schematic side view illustrating a display device of an image display device according to a modification of the second embodiment.

FIG. 10B is a side view illustrating a display device of an image display device according to a modification of the second embodiment.

The distortion of the optical system is not limited to distortion in two dimensions and may occur in three dimensions. As shown in FIG. 10A, the display device 210 of the image display device according to the embodiment differs from the display device 110 of the image display device 10 according to the first embodiment described above in that the multiple pixels 110p are on a substrate 211 that is convex in the −γ direction. Otherwise, the components of the display device 210 are the same as the components of the display device 110 shown in FIG. 2; the same components are marked with the same reference numerals, and a detailed description is omitted as appropriate.

FIG. 10A shows the display device 210 when the αγ-plane is viewed in plan. As shown in FIG. 10A, the display device 210 includes the substrate 211 and the multiple pixels 110p. The substrate 211 includes a first surface 211-1 and a second surface 211-2. The second surface 211-2 is at the side opposite to the first surface 211-1. The multiple pixels 110p are arranged in a matrix configuration of m rows×n columns at the first surface 211-1. The substrate 211 is rectangular when the αβ-plane is viewed in plan, and is curved to be convex in the −γ direction when the αγ-plane is viewed in plan. For example, the substrate 211 is formed of a flexible material such as a polyimide resin, etc. The configuration of the pixel 110p is the same as that described with reference to FIGS. 7 to 9.

In the example of FIG. 10A, the multiple pixels 110p are arranged in a matrix configuration of m rows×n columns on the first surface 211-1. The m rows×n columns of pixels 110p are arranged to be rectangular on the first surface 211-1.

According to the embodiment, the multiple pixels 110p are arranged on the curved substrate 211 to cancel the field distortion of the optical system. In such a case, when the light transmitted by the optical system projects a first image on a two-dimensional plane, the direction of the field distortion of the optical system is curved in the lateral direction of the projected plane, that is, to be convex in the −γ direction.

FIG. 10B shows a display device 210a when the βγ-plane is viewed in plan. As shown in FIG. 10B, the display device 210a includes a substrate 211a and the multiple pixels 110p.

The substrate 211a includes a first surface 211a-1 and a second surface 211a-2. The second surface 211a-2 is the side opposite to the first surface 211a-1. The multiple pixels 110p are located on the first surface 211a-1. The multiple pixels 110p are arranged in a matrix configuration of m rows×n columns on the first surface 211a-1. As in FIG. 10A, the array of the multiple pixels 110p is a rectangular array of m rows×n columns.

In the example, when the light transmitted by the optical system projects a first image on a two-dimensional plane, the direction of the field distortion of the optical system is curved in the direction perpendicular to the projected plane, that is, to be convex in the −γ direction. The display device 210a is arranged on the first surface 211a-1 to cancel such a field distortion of the optical system.

Figure 11A:
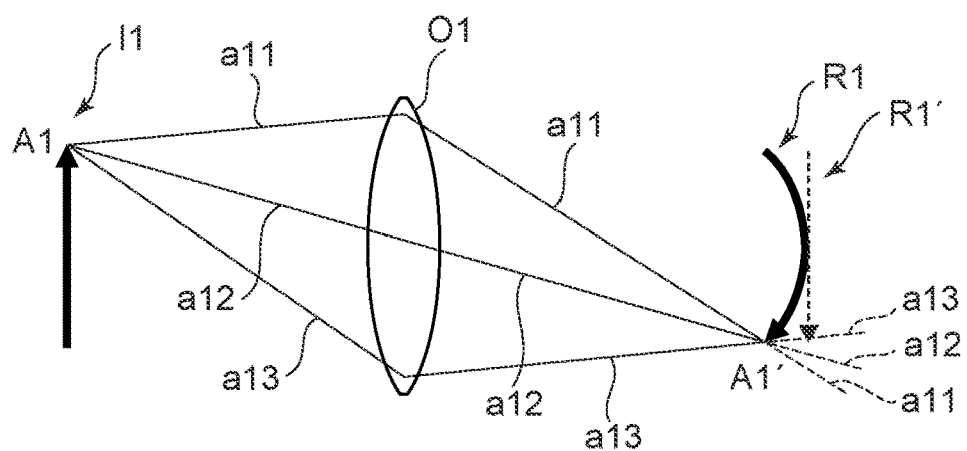
FIG. 11A is a schematic view for describing field distortion.
Figure 11B:
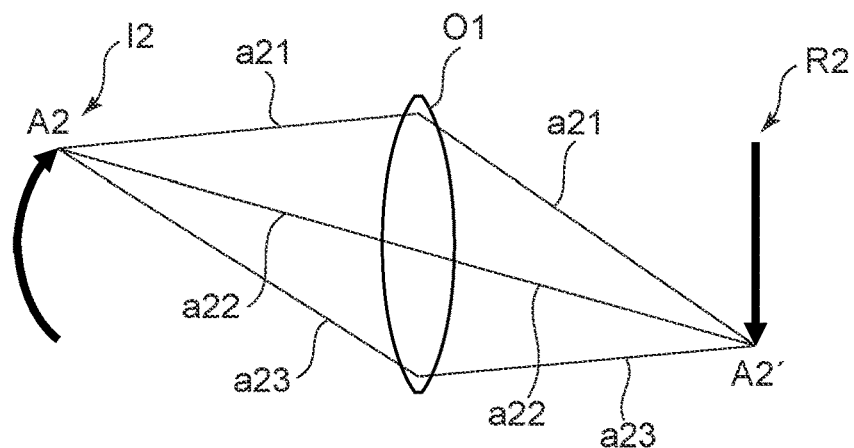
FIG. 11B is a schematic view for describing field distortion.

FIGS. 11A and 11B are schematic views for describing field distortion.

FIG. 11A shows a state in which an object I1 forms an image R1 via an optical system O1. The drawing shows the position at which a point A1 at the tip of the object forms an image via the optical system O1.

As shown in FIG. 11A, a light ray a11 that is emitted from the point A1 is refracted at the upper portion of the optical system O1 and reaches a point A1'. A light ray a12 that is emitted from the point A1 is refracted by substantially the center of the optical system O1 and reaches the point A1'. A light ray a13 that is emitted from the point A1 is refracted by the lower portion of the optical system O1 and reaches the point A1'.

While the point A1' is the position at which the image of the optical system O1 is formed, the position at which the image from the object I1 is formed changes along the height direction of the object I1. The distance to the position at which the image from the object I1 is formed decreases as the point approaches the upper end or lower end of the object I1 as in the point A1. This phenomenon is called field distortion or field curvature. As shown in FIG. 11A, a curved image is formed when forming the image R1 due to the field distortion of the optical system O1. When projecting onto a plane by focusing an image position at the middle in the height direction of the object I1, an actual image R1' is a straight image as in the broken line of FIG. 11A, but becomes unclear toward the upper end and the lower end due to the shift of the position at which the image is formed.

To cancel the field distortion, it is sufficient to curve the image according to the field distortion.

As shown in FIG. 11B, a light ray a21 that is emitted from a point A2 at the tip of a curved object 12 is refracted by the upper portion of the optical system O1 and reaches a point A2'. A light ray a22 that is emitted from the point A2 is refracted by substantially the center of the optical system O1 and reaches the point A2'. A light ray a23 that is emitted from the point A2 is refracted by the lower portion of the optical system O1 and reaches the point A2'.

The point A2' is the position at which the optical system O1 forms the image, and an image R2 is formed by optical paths having the reverse paths of those of FIG. 11A. When a plane is located at the imaging position of the image R2 and the object 12 is projected onto the plane, the image R2 can be observed without distortion.

FIGS. 12A to 13B are side views illustrating display devices of image display devices according to modifications of the second embodiment.

Because the field distortion is determined by the design of the optical system, various configurations of the display device are set according to the properties of the field distortion of the optical system. FIG. 10A above is an example of correcting the field distortion in the α-direction, and FIG. 10B is a configuration example of a display device correcting the field distortion in the β-direction. The configuration of the display device can be adapted to field distortion in various directions by combining such configurations.

Figure 12A:
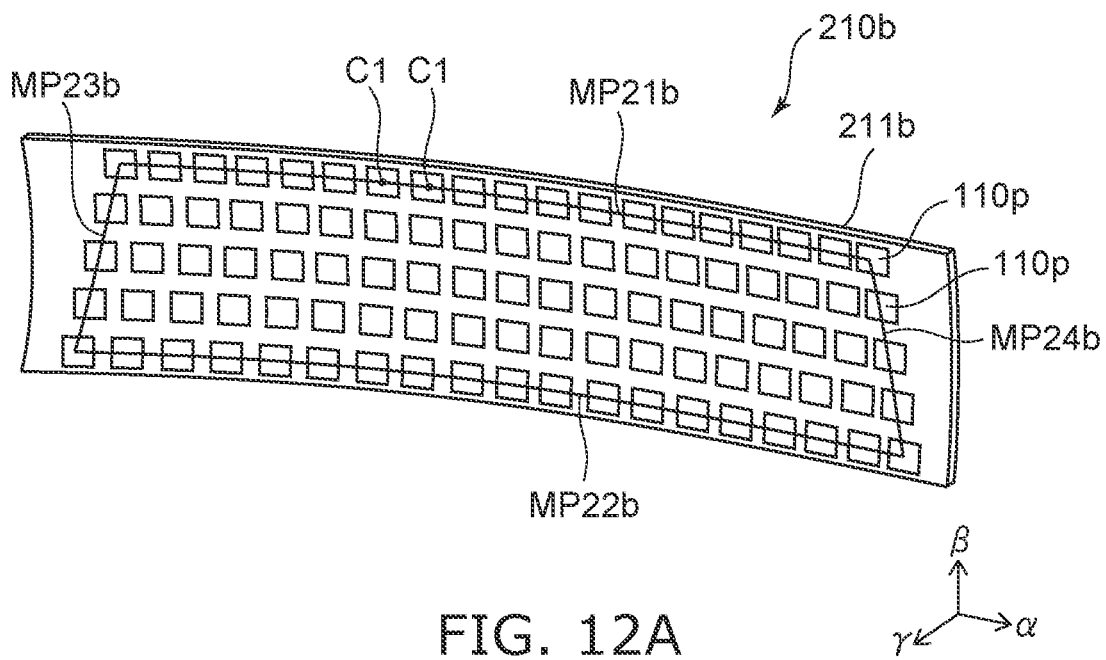
FIG. 12A is a schematic perspective view illustrating a display device of an image display device according to a modification of the second embodiment.
Figure 12B:
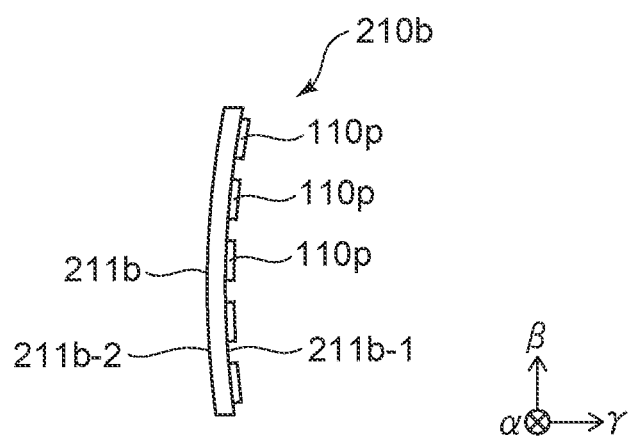
FIG. 12B is a schematic side view illustrating the display device of the image display device according to the modification of the second embodiment.

The example of FIGS. 12A and 12B is an example of a display device 210b when field distortion in both the α-direction and the β-direction is corrected. A substrate 211b of the display device 210b is curved to be convex in the −γ direction when the αγ-plane is viewed in plan and curved to be convex in the −γ direction when the βγ-plane is viewed in plan. The multiple pixels 110p are located at a first surface 211b-1 side.

Figure 13A:
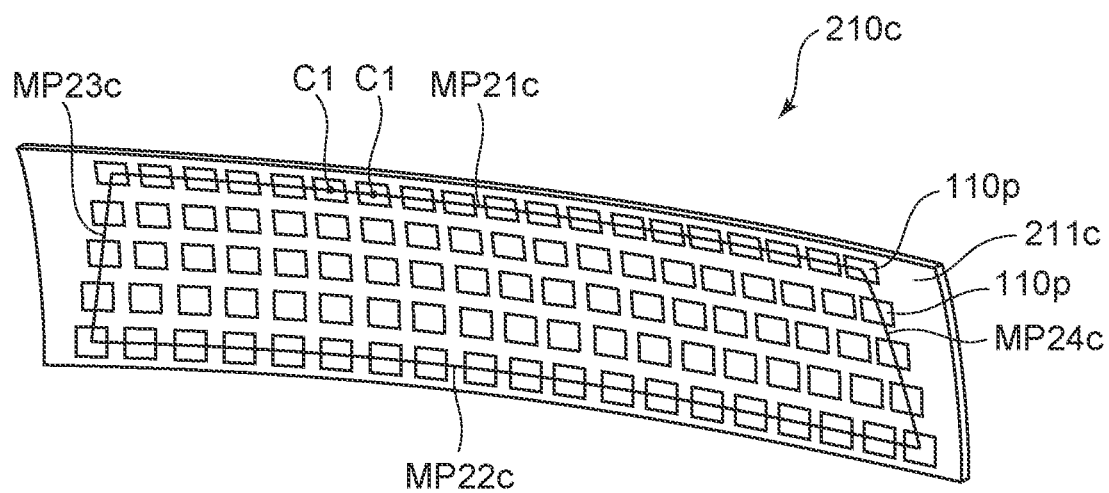
FIG. 13A is a schematic perspective view illustrating a display device of an image display device according to a modification of the second embodiment.
Figure 13B:
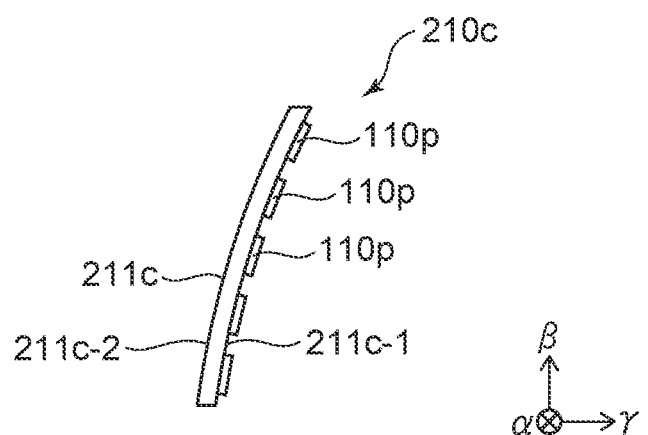
FIG. 13B is a schematic side view illustrating the display device of the image display device according to the modification of the second embodiment.

The example of FIGS. 13A and 13B is an example of a display device 210c when field distortion in both the α-direction and the β-direction is corrected. A substrate 211c of the display device 210c is curved to be convex in the −γ direction when the αγ-plane is viewed in plan and curved to be convex in the −γ direction when the βγ-plane is viewed in plan. The multiple pixels 110p are located at a first surface 211c-1 side. In the example, the substrate 211c is set so that the first surface 211c-1 extends in the +γ direction toward the +β direction.

In any of FIGS. 12A to 13B, the multiple pixels 110p that are located on a curved surface are applicable to the pixel arrays of the display devices of the first embodiment and modifications of the first embodiment described with reference to FIGS. 2 to 6. In the examples of FIGS. 12A to 13B, the pixel array is the trapezoidal array described with reference to FIG. 4B.

Effects of the light source unit and the image display device according to the embodiment will now be described.

The light source unit and the image display device according to the embodiment provide the following effects in addition to effects similar to the light source unit and the image display device according to the first embodiment. Namely, the multiple pixels 110p are arranged on curved substrates in the display devices 210 to 210c of the light source unit. The curves of the substrates are set to cancel field distortion that may occur in the optical system of the light source unit and the image display device. Therefore, an image without distortion can be displayed according to the individually designed optical system.

The optical system included in the light source unit and the image display device includes the surface of the front windshield 13a projecting the image in addition to the imaging optical system 120 and the mirror 131 of the reflection unit 12 shown in FIG. 1. As shown in FIG. 1, there are many cases where the front windshield 13a is formed to be a curved surface convex in the travel direction of the vehicle 13 rather than a flat plane. The light source unit and the image display device according to the embodiment can have the optimal pixel arrangement based on the optical design of the entire optical system.

Third Embodiment

Figure 14:
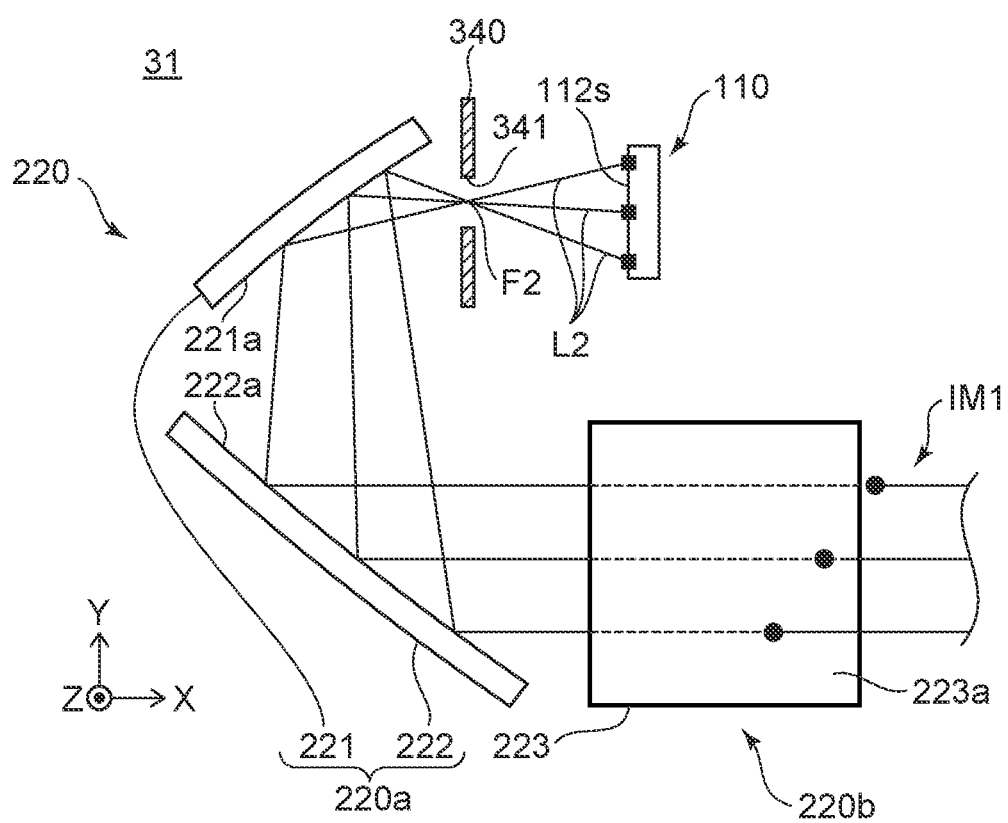
FIG. 14 is a schematic view showing a light source unit according to a third embodiment.

FIG. 14 is a schematic view showing a light source unit according to a third embodiment.

FIG. 14 is a schematic plan view when projected onto the XY-plane. As shown in FIG. 14, the light source unit 31 according to the embodiment differs from the light source unit 11 shown in FIG. 1 in that a light-shielding member 340 is further included. FIG. 14 shows the light-shielding member 340 in cross section and the other components in end view.

An imaging optical system 220 includes an input element 221, an intermediate element 222, and an output element 223. The input element 221 and the intermediate element 222 are included in a bending part 220a, and the output element 223 is included in a direction modifying part 220b. A focal point F2 of the imaging optical system 220 is positioned between the display device 110 and the input element 221. In other words, the imaging optical system 220 is substantially telecentric at the first image IM1 side.

The input element 221 is a mirror that includes a concave mirror surface 221a. The input element 221 is located at the −X side of the display device 110 and faces the display device 110. The light that is emitted from the display device 110 is reflected by the input element 221. The intermediate element 222 is a mirror that includes a concave mirror surface 222a. The intermediate element 222 is located adjacent to the input element 221 in the Y-direction and faces the input element 221. The light that is reflected by the input element 221 is further reflected by the intermediate element 222. Multiple main rays L2 that are emitted from mutually-different positions of the display device 110 and pass through the focal point F2 are bent to become substantially parallel to each other by being sequentially reflected by the input element 221 and the intermediate element 222.

The output element 223 is a mirror that includes a flat mirror surface 223a. The output element 223 is located at the +X side of the intermediate element 222 and faces the intermediate element 222. According to the first embodiment, similarly to the mirror surface 123a of the output element 123, the mirror surface 223a is tilted with respect to the XY-plane in the −Z/+X direction. As a result, the output element 223 reflects the light reflected by the intermediate element 222 in a direction tilted with respect to the Z-direction in the −Z/+X direction.

The light-shielding member 340 is located between the display device 110 and the input element 221 of the imaging optical system 220. For example, the light-shielding member 340 has a flat plate shape substantially parallel to the ZY-plane. An aperture 341 that extends through the light-shielding member 340 in the X-direction is provided in the light-shielding member 340. The focal point F2 of the imaging optical system 220 is positioned inside the aperture 341. The light that is emitted from the display device 110 and passes through the focal point F2 and the vicinity of the focal point F2 passes through the aperture 341 of the light-shielding member 340 and is incident on the input element 221, and the greater part of the light other than the light passing through the aperture 341 is shielded by the light-shielding member 340.

Appropriate combinations of the pixel arrays described with reference to FIGS. 2 to 6 and the configurations described with reference to FIGS. 10A to 13B are applied to the display device 110 according to the distortion of the optical system.

As described above, the light source unit 31 according to the embodiment further includes the light-shielding member 340. The light-shielding member 340 is located between the display device 110 and the imaging optical system 220. The light-shielding member 340 includes the aperture 341 through which a portion of the light from the display device 110 toward the imaging optical system 220 passes. The light-shielding member 340 shields another portion of the light from the display device 110 toward the imaging optical system 220, and can thereby suppress the incidence on the imaging optical system 220 of light, i.e., ineffective light, that is emitted by the display device 110 but does not pass through the focal point F2. The occurrence of stray light can be suppressed thereby. When light such as sunlight or the like from outside the light source unit 31 penetrates the light source unit 31, the light can be prevented from traveling toward the display device 110. A rise of the temperature of the display device 110 can be suppressed thereby. This is because problems such as misalignment of the optical axis due to thermal expansion, etc., occur when the temperature of the display device 110 rises above a prescribed value.

Fourth Embodiment

Figure 15:
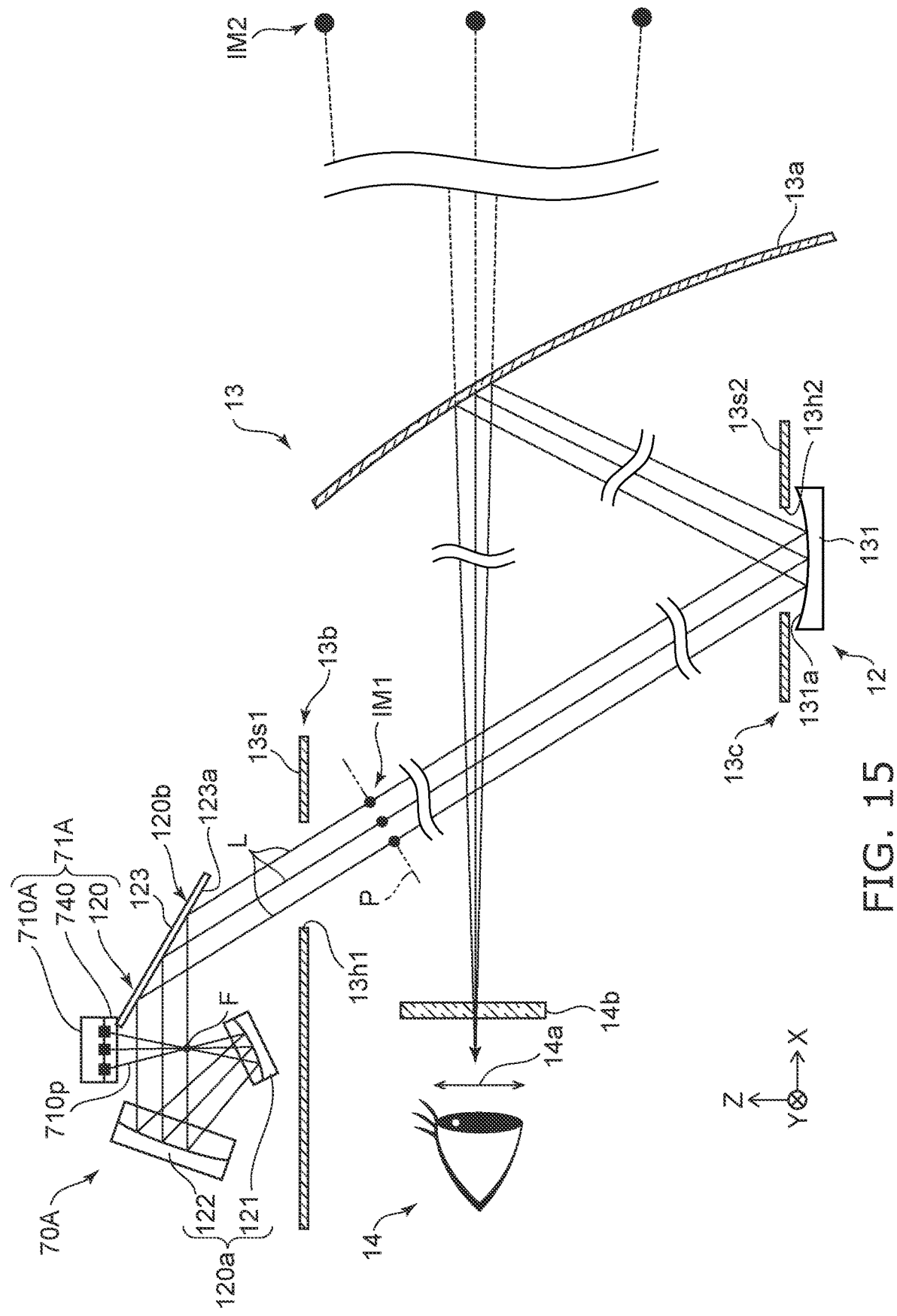
FIG. 15 is a schematic cross-sectional view showing a head-up display in which an image display device according to a fourth embodiment is applied.

FIG. 15 is a cross-sectional view showing a head-up display in which the image display device according to the embodiment is applied.

Figure 16:
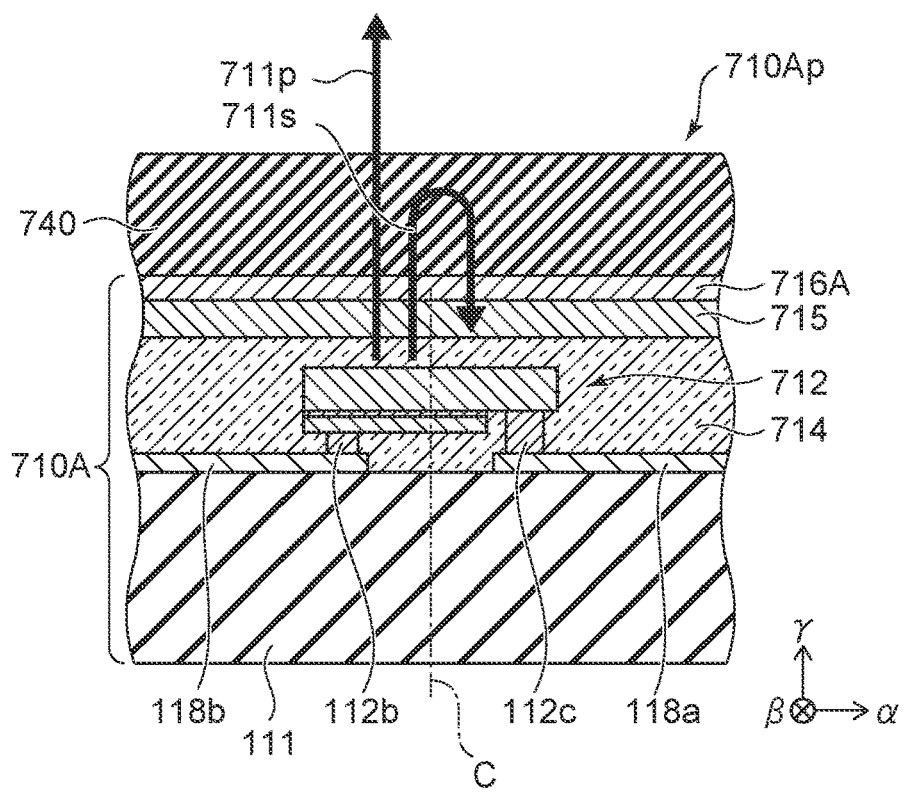
FIG. 16 is an enlarged schematic cross-sectional view showing the display device and the reflective polarizing element shown in FIG. 15.

FIG. 16 is an enlarged cross-sectional view showing a portion of the display device and the reflective polarizing element shown in FIG. 15.

The image display device 70A according to the embodiment differs from the image display device 10 according to the first embodiment in that a display device 710A is included instead of the display device 110, and a reflective polarizing element 740 is further included.

The display device 710A differs from the display device 710 described with reference to FIG. 8B in that a light-scattering member 716A is included instead of the color filter 716. The display device 710A includes multiple pixels 710Ap, and the multiple pixels 710Ap each include the LED element 712, the wavelength conversion member 715, and the light-scattering member 716A. Otherwise, the configuration of the display device 710A is similar to that of the display device 710 shown in FIG. 8B. The light-scattering member 716A is provided to cover the LED element 712. The light-scattering member 716A includes, for example, a light-transmitting resin member and light-scattering particles or voids located inside the resin member. Examples of the resin member include, for example, polycarbonate, etc. Examples of the light-scattering particles include, for example, materials having a refractive index difference with the resin member such as titanium oxide, etc. A light scattering effect may be obtained by providing an unevenness in the surface of the light-scattering member 716A by surface roughening.

As shown in FIG. 16, the reflective polarizing element 740 is located on the display device 710A. According to the embodiment, the reflective polarizing element 740 is located on the light-scattering member 716A. Therefore, the light that is emitted from the LED element 712 and the wavelength conversion member 715 is incident on the reflective polarizing element 740. The reflective polarizing element 740 transmits a first polarized light 711p of the light emitted from the display device 710A and reflects, toward the display device 710A, a second polarized light 711s of the light emitted from the display device 710A. The oscillation direction of the electric field of the second polarized light 711s is substantially orthogonal to the oscillation direction of the electric field of the first polarized light 711p.

According to the embodiment, the first polarized light 711p is P-polarized light, and the second polarized light 711s is S-polarized light. "P-polarized light" and "S-polarized light" are defined with respect to the incident plane on which the light is incident. P-polarized light means polarized light oscillating in the incident plane, and S-polarized light means polarized light oscillating in the direction perpendicular to the incident plane. Herein, the incident plane means the incident plane when the main rays L are incident on the front windshield 13a for the user 14 of the vehicle 13 to view the second image IM2 via the front windshield 13a.

There are cases where the user 14 of the vehicle 13 wears polarized sunglasses 14*b* to reduce glare such as sunlight reflected by a puddle in front of the vehicle 13 and transmitted by the front windshield 13*a*, etc. In such a case, the component corresponding to the P-polarized light of the sunlight reflected by the puddle or the like when viewed from the front windshield 13*a* is particularly reduced; therefore, the polarized sunglasses 14*b* are designed to shield the greater part of S-polarized light. Accordingly, when the user 14 wears the polarized sunglasses 14*b*, there is a possibility that the second image IM2 may be difficult for the user 14 to view because the polarized sunglasses 14*b* undesirably shield the greater part of the S-polarized light included in the light emitted by the display device 710A. In the specification, P-polarized light and S-polarized light are physically defined by reflection objects such as the puddles and the like described above.

According to the embodiment, the reflective polarizing element 740 transmits the first polarized light 711*p* and reflects the second polarized light 711*s* of the light emitted from the display device 710A. After traveling via the imaging optical system 120, the reflection unit 12, and the inner surface of the front windshield 13*a*, the greater part of the first polarized light 711*p* transmitted by the reflective polarizing element 740 enters the eyebox 14*a* without being shielded by the polarized sunglasses 14*b*. The incident angle of the first polarized light 711*p* when incident on the inner surface of the front windshield 13*a* is set to a different angle from Brewster's angle.

Specifically, as shown in FIG. 16, the light that is emitted from the LED element 712 is irradiated on the wavelength conversion member 715. As a result, the wavelength conversion member 715 is excited and emits light of a longer light emission peak wavelength than the light emitted from the LED element 712. According to the embodiment, the light that is emitted from the display device 710A includes light emitted from the LED element 712 and light emitted from the wavelength conversion member 715. Hereinbelow, the light that is emitted from the display device 710A and emitted from the LED element 712 also is called "short-wavelength light," and the light that is emitted from the wavelength conversion member 715 also is called "long-wavelength light." However, a greater part of the light emitted from the LED element 712 may be absorbed by the wavelength conversion member 715.

The greater part of the first polarized light 711*p* included in the short-wavelength light and long-wavelength light is transmitted by the reflective polarizing element 740 and emitted from the imaging optical system 120.

The greater part of the second polarized light 711*s* included in the short-wavelength light and long-wavelength light is reflected by the reflective polarizing element 740. Scattering reflection of a portion of the second polarized light 711*s* reflected by the reflective polarizing element 740 is performed by components of the display device 710A such as the light-scattering member 716A, the wavelength conversion member 715, etc. A portion of the second polarized light 711*s* is converted into the first polarized light 711*p* by the scattering reflection. A portion of the first polarized light 711*p* converted from the second polarized light 711*s* is transmitted by the reflective polarizing element 740 and emitted from a light source unit 71A. Therefore, the luminance of the first image IM1 can be increased while increasing the ratio of the first polarized light 711*p* included in the light emitted from the light source unit 71A. By improving the luminance of the first image IM1, the luminance of the second image IM2 also is improved. As a result, the user 14 more easily views the second image IM2.

A portion of the short-wavelength light included in the second polarized light 711*s* may be reflected by the reflective polarizing element 740 and then incident on the wavelength conversion member 715. In such a case, an effect can be expected in which the wavelength conversion member 715 absorbs the short-wavelength light of the second polarized light 711*s* and radiates new long-wavelength light. Both the scattered reflection light and the radiated light have substantially Lambertian light distributions.

The reflective polarizing element 740 itself may perform scattering reflection of the second polarized light 711*s*. In such a case as well, a portion of the second polarized light 711*s* is converted into the first polarized light 711*p* by scattering reflection.

For example, a multilayer stacked thin film polarizing plate in which thin film layers of different polarization characteristics are stacked, etc., can be used as the reflective polarizing element 740.

According to the embodiment, one reflective polarizing element 740 covers all of the pixels of the display device 710A. However, the light source unit may include multiple reflective polarizing elements, and the reflective polarizing elements may be located respectively on the pixels. The configuration of the display device used in combination with the reflective polarizing element is not limited to the configuration described above. For example, the display device may be configured without a light-scattering member by using the light scattering reflection effect of the wavelength conversion member. The display device may be configured without a wavelength conversion member by using the scattering reflection effect of the light-scattering member. The display device may be configured without a wavelength conversion member or a light-scattering member by using the light scattering reflection effect of multiple recesses or multiple protrusions provided in the light-emitting surface of the LED element as in the first embodiment.

Appropriate combinations of the pixel array described with reference to FIGS. 2 to 6 and the configurations described with reference to FIGS. 10A to 13B are applied to the display device 710A according to the distortion of the optical system. This is similar for the display device 710A of a light source unit 80A according to a fifth embodiment described below with reference to FIG. 17.

Effects of the embodiment will now be described.

The light source unit 71A according to the embodiment further includes the reflective polarizing element 740 that is located on the display device 710A, transmits the first polarized light 711*p* of the light emitted from the display device 710A, and reflects the second polarized light 711*s* of the light emitted from the display device 710A. Therefore, the luminance of the first image IM1 can be increased while increasing the ratio of the first polarized light 711*p* included in the light emitted from the light source unit 71A.

The light that is emitted from the reflective polarizing element 740 also has a substantially Lambertian light distribution. Therefore, according to the embodiment as well, the light source unit 71A that is small and can form a high-quality first image IM1 can be provided. Because the multiple LED elements 712 are discretely mounted on the substrate 111, the first image IM1 may have a grainy appearance. The wavelength conversion member 715 has the effect of relaxing the grainy appearance. The light-scattering member 716A can further reinforce the effect of relaxing the grainy appearance.

In the display device 710A according to the embodiment, the multiple pixels 110p are arranged to cancel the distortion of the optical system including the front windshield 13a. As a result, the user 14 can observe the second image IM2 projected onto the front windshield 13a as an image with low distortion.

Fifth Embodiment

Figure 17:
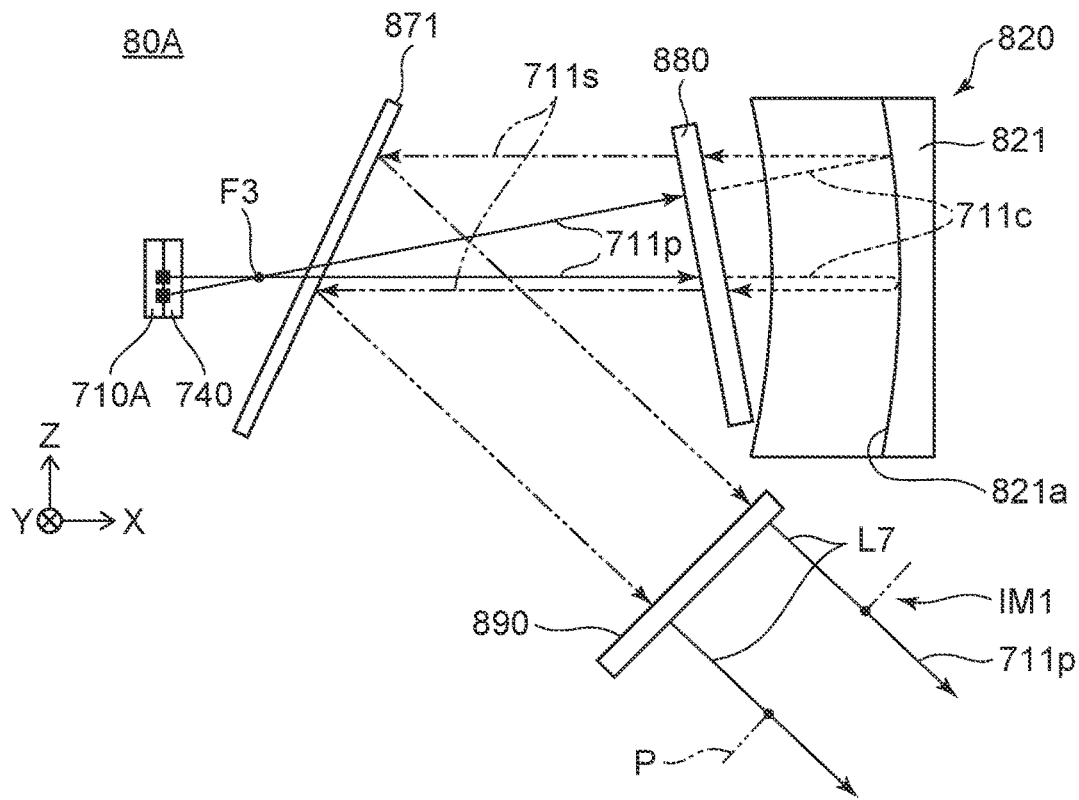
FIG. 17 is a schematic side view showing a light source unit according to a fifth embodiment.

FIG. 17 is a side view showing a light source unit according to a fifth embodiment.

As shown in FIG. 17, the light source unit 80A according to the embodiment includes the display device 710A similar to that of the fourth embodiment, the reflective polarizing element 740 similar to that of the fourth embodiment, an imaging optical system 820, a reflective polarizing element 871, a first waveplate 880, and a second waveplate 890. The display device 710A, the reflective polarizing element 871, the first waveplate 880, and the imaging optical system 820 are arranged in the X-direction in this order. However, the direction in which the display device, the reflective polarizing element, the first waveplate, and the imaging optical system are arranged is not limited to the X-direction.

According to the embodiment, the display device 710A is arranged so that the light-emitting surface of the display device 710A faces the +X direction. However, the orientation of the display device is not limited to such an orientation.

The reflective polarizing element 740 is located on the display device 710A. According to the embodiment, the reflective polarizing element 740 transmits the first polarized light 711p which is P-polarized light of the light emitted from the display device 710A and reflects, toward the display device 710A, the second polarized light 711s which is S-polarized light of the light emitted from the display device 710A.

The imaging optical system 820 includes one mirror 821. The mirror 821 includes a concave mirror surface 821a. The mirror 821 reflects the light emitted from the display device 710A and forms the first image IM1 corresponding to the image displayed by the display device 710A. The mirror 821 is substantially telecentric at the first image IM1 side. In other words, multiple main rays L7 that are emitted from mutually-different positions on the display device 710A and reach the first image IM1 cross at a focal point F3 between the display device 710A and the mirror 821. The multiple main rays L7 that are emitted from the mirror 821 are substantially parallel to each other.

The reflective polarizing element 871 is located between the display device 710A and the mirror 821. The reflective polarizing element 871 transmits the first polarized light 711p and reflects the second polarized light 711s. The reflective polarizing element 871 can include, for example, a beam splitter. For example, the reflective polarizing element 871 has a flat plate shape. For example, the reflective polarizing element 871 is tilted in the +Z/+X direction. However, the shape and orientation of the reflective polarizing element are not limited to those described above.

The first waveplate 880 is located between the reflective polarizing element 871 and the mirror 821. According to the embodiment, the first waveplate 880 is a quarter-wave plate. The first waveplate 880 has a flat plate shape. For example, the first waveplate 880 is arranged to be substantially orthogonal to the main rays L7 reflected by the mirror 821. In other words, the first waveplate 880 is arranged to be substantially parallel to the YZ-plane. However, the orientation of the first waveplate is not limited to such an orientation. For example, the first waveplate may be tilted with respect to the plane orthogonal to the main ray reflected by the mirror.

The first waveplate 880 may be arranged to be tilted at an angle from the XY-plane or the YZ-plane. By tilting the first waveplate 880, the formation of a ghost image due to stray light caused by multiple reflections of the light between the first waveplate 880 and the mirror surface 821a can be prevented. The direction of the tilt is determined according to the position at which the ghost image is formed.

Figure 18A:
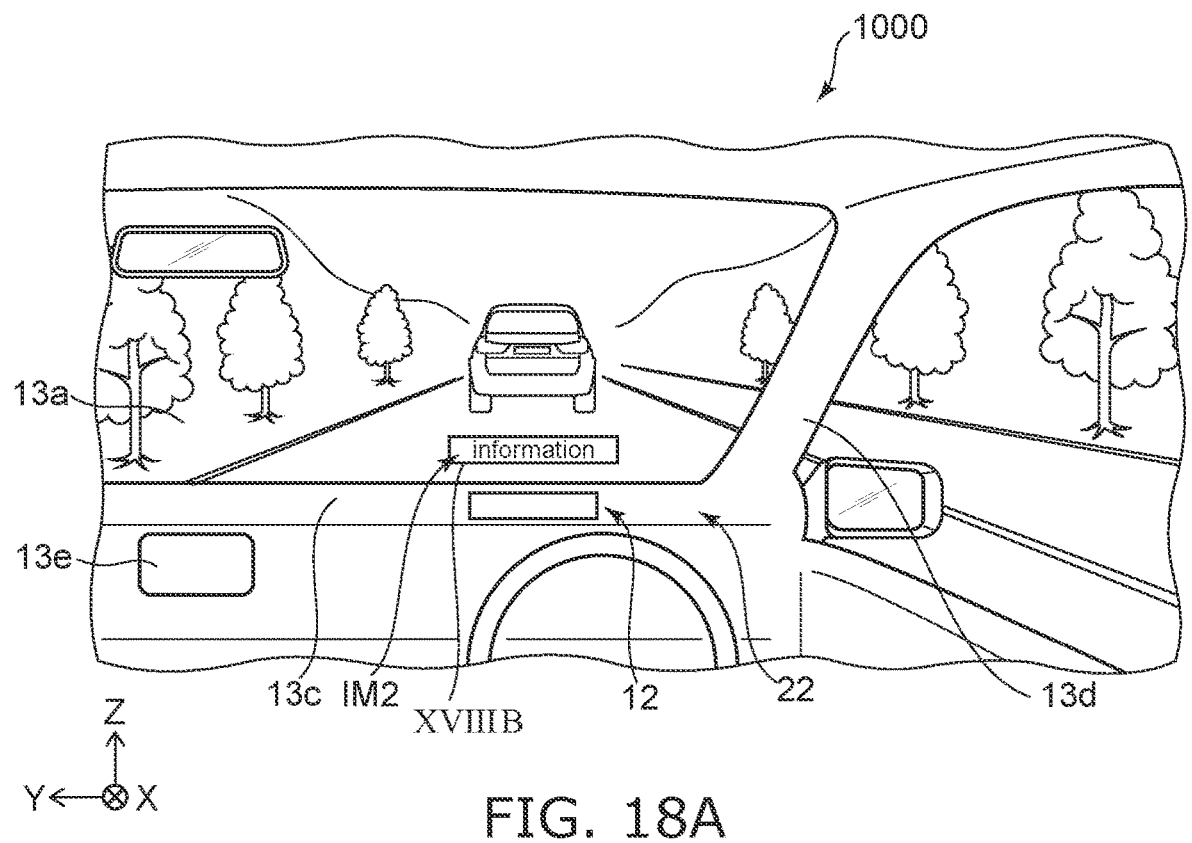
FIG. 18A is a schematic view for describing an operation of the light source unit according to the fifth embodiment.

FIG. 18A is a schematic view for describing an operation of the light source unit according to the fifth embodiment.

FIG. 18A shows an example of an automobile 1000 in which the light source unit 80A according to the embodiment is applied to the image display device 10 shown in FIG. 1 and mounted in the vehicle 13. FIG. 18A schematically illustrates the landscape visible in front of the driver of the automobile 1000, i.e., the user 14.

Although not illustrated in FIG. 18A, the light source unit 11 shown in FIG. 1 is located at the ceiling part of the vehicle 13. The reflection unit 12 is located at the dashboard part 13c of the vehicle 13. The reflection unit 12 is located at a position and angle to face the eyebox 14a of the user 14 when the user 14 is in the driver's seat of the vehicle 13.

Figure 18B:
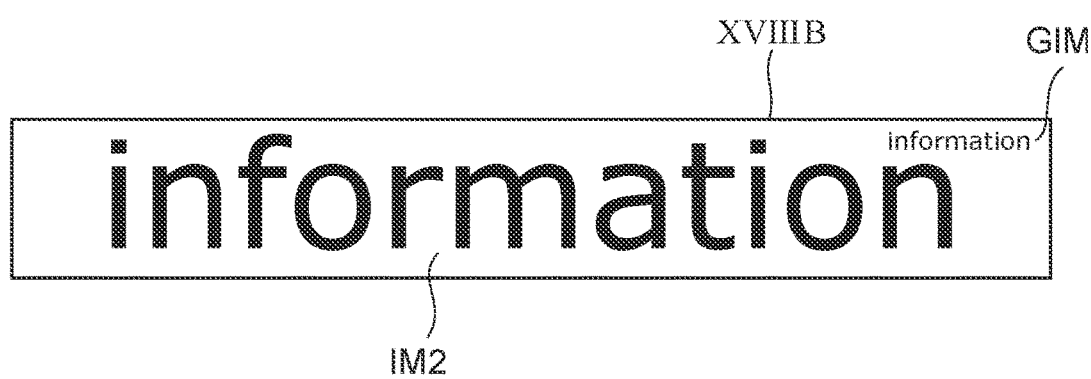
FIG. 18B is an enlarged schematic view of portion XVIIIB of FIG. 18A.

FIG. 18B is an enlarged schematic view of portion XVIIIB of FIG. 18A.

As described above, according to the tilt of the first waveplate 880 from the XY-plane or the YZ-plane, there are cases where the user 14 observes a ghost image GIM at the vicinity of the second image IM2 as shown in FIG. 18B. The formation of the ghost image GIM at the vicinity of the second image IM2 can be eliminated by mounting the first waveplate 880 at the appropriate angle.

The description continues now by returning to FIG. 17.

The second waveplate 890 is located at the -Z side of the first waveplate 880. According to the embodiment, the second waveplate 890 is a half-wave plate. The second waveplate 890 has a flat plate shape. For example, the second waveplate 890 is arranged to be substantially orthogonal to the main rays L7 that are reflected by the mirror 821, transmitted by the first waveplate 880, and then reflected by the reflective polarizing element 871. Accordingly, the second waveplate 890 is arranged to be tilted in the +Z/+X direction. However, the orientation of the second waveplate is not limited to such an orientation. For example, the second waveplate may be tilted with respect to a plane orthogonal to the main rays.

The greater part of the first polarized light 711p of the light emitted from the display device 710A is transmitted by the reflective polarizing element 740, and the greater part of the second polarized light 711s is reflected by the reflective polarizing element 740 and returns to the display device 710A.

The greater part of the first polarized light 711p transmitted by the reflective polarizing element 740 is transmitted by the reflective polarizing element 871 and then incident on the first waveplate 880. The first waveplate 880 is arranged to convert the greater part of the incident first polarized light 711p into circularly polarized light 711c. The greater part of the circularly polarized light 711c emitted from the first waveplate 880 is reflected by the mirror surface 821a of the mirror 821.

The greater part of the circularly polarized light 711c reflected by the mirror surface 821a is incident on the first waveplate 880. The first waveplate 880 converts the greater part of the incident circularly polarized light 711c into the second polarized light 711s. The greater part of the second polarized light 711s emitted from the first waveplate 880 is reflected by the reflective polarizing element 871 and travels toward the formation position P of the first image IM1.

The greater part of the second polarized light 711s reflected by the reflective polarizing element 871 is incident on the second waveplate 890. The second waveplate 890 is arranged to convert the greater part of the incident second polarized light 711s into the first polarized light 711p.

Effects of the embodiment will now be described.

The light source unit 80A according to the embodiment includes the display device 710A configured to display an image, the mirror 821 reflecting the light emitted from the display device 710A to form the first image IM1 corresponding to the image, the reflective polarizing element 871 located between the display device 710A and the mirror 821, and the first waveplate 880 located between the reflective polarizing element 871 and the mirror 821. The reflective polarizing element 871 transmits the first polarized light 711p of the light emitted from the display device 710A. The first waveplate 880 converts the first polarized light 711p transmitted by the reflective polarizing element 871 into the circularly polarized light 711c. The circularly polarized light 711c that is emitted from the first waveplate 880 is reflected toward the first waveplate 880. The first waveplate 880 converts the circularly polarized light 711c reflected by the mirror 821 into the second polarized light 711s. The reflective polarizing element 871 reflects, toward the formation position P of the first image IM1, the second polarized light 711s emitted from the first waveplate 880.

The mirror 821 is substantially telecentric at the first image IM1 side, and the light that is emitted from the display device 710A has a substantially Lambertian light distribution. Therefore, according to the embodiment as well, a light source unit 80A that is small and can display a high-quality image can be provided.

Also, the light source unit 80A can be even smaller because the first image IM1 can be formed by one mirror 821.

Because the light reflected by the mirror 821 is reflected toward the formation position P of the first image IM1 by the reflective polarizing element 871 located between the display device 710A and the mirror 821, the light source unit 80A can be even smaller while forming the first image IM1 at the desired formation position P.

The light source unit 80A further includes the second waveplate 890 that converts the second polarized light 711s reflected by the reflective polarizing element 871 into the first polarized light 711p. Therefore, the ratio of the first polarized light 711p included in the light emitted from the light source unit 80A can be increased.

In the example shown in FIG. 17, the first waveplate 880 is arranged to be tilted at an angle from the XY-plane or the YZ-plane. Thus, by arranging the first waveplate 880 to be tilted, the formation of a ghost image due to multiple reflections of the light between the first waveplate 880 and the mirror surface 821a can be prevented. By arranging the first waveplate 880 at the appropriate angle from the XY-plane or the YZ-plane, the formation of the ghost image can be suppressed according to the viewing position.

The light source unit 80A further includes the reflective polarizing element 740 that is located on the display device 710A, transmits the first polarized light 711p of the light emitted from the display device 710A, and reflects, toward the display device 710A, the second polarized light 711s of the light emitted from the display device 710A. Therefore, the luminance of the first image IM1 and the luminance of the second image IM2 can be increased while increasing the ratio of the first polarized light 711p included in the light emitted from the light source unit 80A.

Sixth Embodiment

Figure 19:
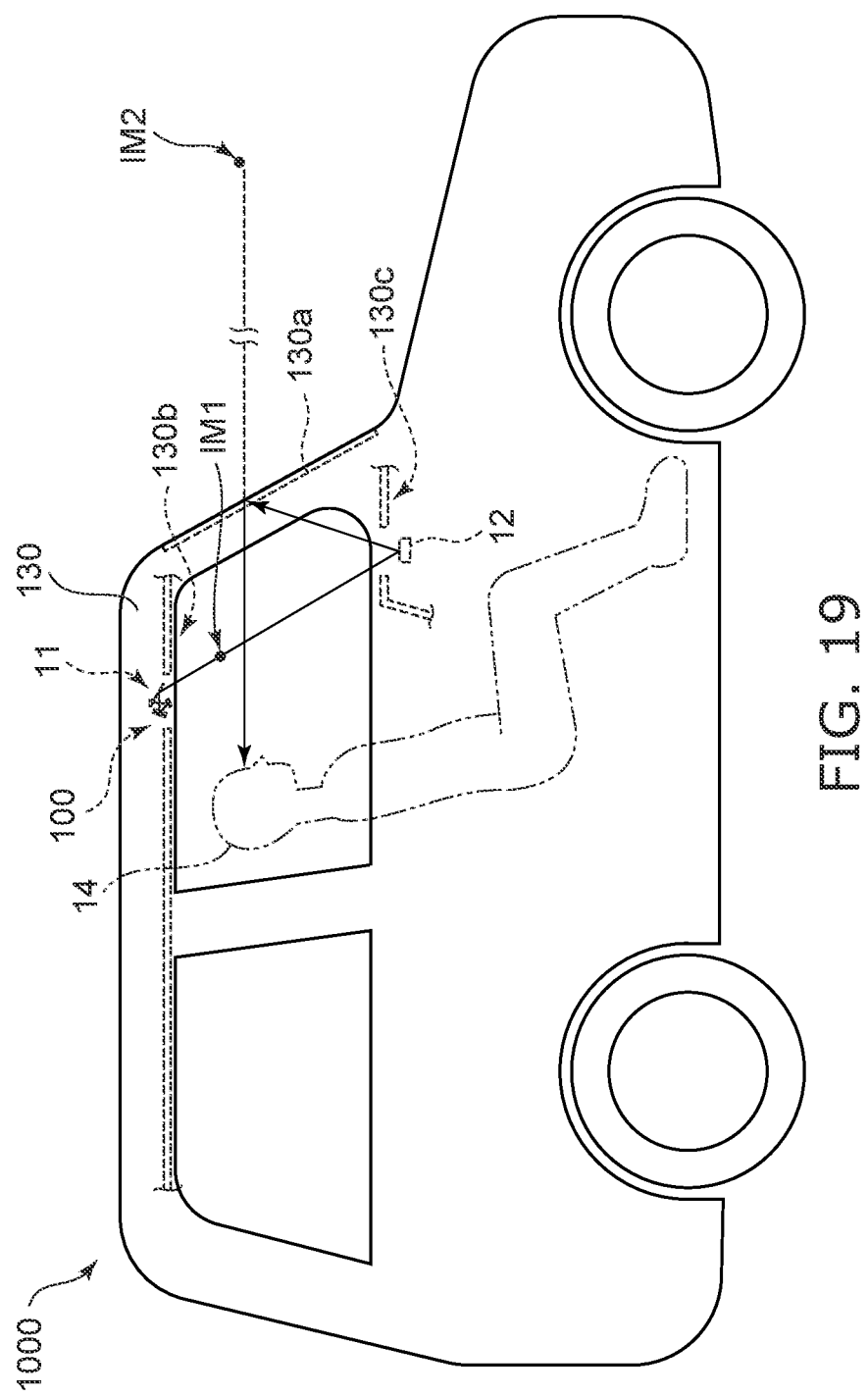
FIG. 19 is a schematic side view showing a vehicle in which an image display device according to a sixth embodiment is mounted.

FIG. 19 is a side view showing a vehicle in which an image display device according to the embodiment is mounted.

The image display device 100 according to the embodiment can be mounted in the vehicle 130 and used as a HUD. In other words, an automobile 1000 according to the embodiment includes the vehicle 130 and the image display device 100. The image display device 100 is fixed to the vehicle 130. This is similar for other embodiments as well. The light source unit 11 of the image display device 100 is located at a ceiling part 130b of the vehicle 130. The reflection unit 12 of the image display device 100 is located at a dashboard part 130c of the vehicle 130.

The light source unit 11 that is located at the ceiling part 130b forms the first image IM1 between the light source unit 11 and the reflection unit 12. The reflection unit 12 reflects the light emitted from the light source unit 11. The greater part of the light reflected by the reflection unit 12 is reflected by the inner surface of a front windshield 130a and enters the eyebox of the user 14. As a result, the user 14 can view the second image IM2. The light source unit 11 also can be configured to have a continuous body with a rearview mirror unit (not illustrated), etc.

The pixel arrays and substrates described with reference to FIGS. 1 to 13B are applicable to the display device of the light source unit 11. The configuration of the pixel array and/or substrate that is applied and the combination of the pixel array and the substrate that is applied is set according to the characteristics of the optical system that includes the imaging optical system, the reflection unit, the front windshield 13a projecting the second image IM2, and a combiner.

The configurations of the multiple embodiments and multiple modifications described above can be appropriately combined to the extent of feasibility.

As described above, the arrangement of the light source unit and the reflection unit can be set freely as long as the first image can be formed between the light source unit and the reflection unit, and the light emitted from the reflection unit can be irradiated on the reflecting surfaces such as the inner surface of the front windshield, etc.

What is claimed is:

1. A light source unit comprising:
a display device configured to emit light having a substantially Lambertian light distribution and to display an image, the display device comprising a plurality of pixels arranged in a matrix configuration in a same plane, wherein pixels among the plurality of pixels located at an outermost perimeter are arranged so that straight lines connecting centers of the pixels located at the outermost perimeter do not form a rectangle; and
an imaging optical system comprising:
an input element on which light emitted from the display device is incident, and
an output element on which light traveling via the input element is incident, light emitted from the output element forming a first image corresponding to the image, wherein:
the imaging optical system is substantially telecentric at a first image side; wherein:
the light emitted from the display device has a light distribution pattern in which a luminous intensity in a direction of an angle θ with respect to an optical axis of the light emitted from the display device is approximated by $\cos^n θ$ times a luminous intensity at the optical axis, wherein n is a value greater than 0.

2. The light source unit according to claim 1, wherein: n is not more than 11.

3. The light source unit according to claim 1, wherein: each of the plurality of pixels comprises a light emitting diode element.

4. The light source unit according to claim 3, wherein: light emitted from each light emitting diode element has a substantially Lambertian light distribution.

5. The light source unit according to claim 3, wherein: the display device comprises a wavelength conversion member located on the light emitting diode elements.

6. The light source unit according to claim 1, wherein: the imaging optical system comprises a bending part comprising the input element, the bending part being configured to bend a plurality of main rays from mutually-different positions of the display device such that the main rays cross each other before being incident on the input element and reaching the first image, and
the bending part are configured to bend the plurality of main rays to be substantially parallel to each other before and after the first image.

7. The light source unit according to claim 6, wherein: the imaging optical system further comprises a direction modifying part comprising the output element, the direction modifying part being configured to modify a travel direction of the plurality of main rays so that the plurality of main rays traveling via the bending part are oriented toward a formation position of the first image.

8. The light source unit according to claim 1, further comprising:
a light-shielding member located between the display device and the imaging optical system, the light-shielding member comprising an aperture located such that a first portion of light from the display device toward the imaging optical system passes through the aperture, and a second portion of the light from the display device toward the imaging optical system is shielded by the light-shielding member.

9. The light source unit according to claim 1, wherein: the plurality of pixels are arranged to eliminate a two-dimensional distortion of an optical system comprising the imaging optical system.

10. An image display device comprising:
the light source unit according to claim 1; and
a reflection unit separated from the light source unit such that the first image is formed between the light source unit and the reflection unit, the reflection unit configured to reflect light emitted from the imaging optical system.

11. An automobile comprising:
a vehicle; and
the image display device according to claim 10 located in the vehicle.

12. A light source unit comprising:
a display device configured to emit light having a substantially Lambertian light distribution and to display an image, wherein the display device comprises a plurality of pixels arranged at a same curved surface; and
an imaging optical system comprising:
an input element on which light emitted from the display device is incident, and
an output element on which light traveling via the input element is incident, light emitted from the output element forming a first image corresponding to the image, wherein:
the imaging optical system is substantially telecentric at a first image side; wherein:
the light emitted from the display device has a light distribution pattern in which a luminous intensity in a direction of an angle θ with respect to an optical axis of the light emitted from the display device is approximated by $\cos^n θ$ times a luminous intensity at the optical axis, wherein n is a value greater than 0.

13. A light source unit comprising:
a display device configured to emit light having a substantially Lambertian light distribution and to display an image, the display device comprising a plurality of pixels arranged in a matrix configuration in a plane, wherein pixels among the plurality of pixels located at an outermost perimeter are arranged so that straight lines connecting centers of the pixels located at the outermost perimeter do not form a rectangle;
a mirror configured to reflect light emitted from the display device to form a first image corresponding to the image;
a reflective polarizing element located between the display device and the mirror, the reflective polarizing element configured to transmit a first polarized light of the light emitted from the display device; and
a waveplate located between the reflective polarizing element and the mirror, the waveplate configured to convert the first polarized light transmitted by the reflective polarizing element into a circularly polarized light; wherein:
the mirror is configured to reflect, toward the waveplate, the circularly polarized light emitted from the waveplate;
the waveplate is configured to convert the circularly polarized light reflected by the mirror into a second polarized light;
the reflective polarizing element is configured to reflect, toward a formation position of the first image, the second polarized light emitted from the waveplate; and
the mirror is substantially telecentric at the first image side.

14. An automobile comprising:
a vehicle;
the light source unit according to claim 13 located in the vehicle; and
a reflection unit separated from the light source unit such that the first image is formed between the light source unit and the reflection unit, the reflection unit configured to reflect light emitted from the imaging optical system.

15. A light source unit comprising:
a display device configured to emit light having a substantially Lambertian light distribution and to display an image, the display device comprising a plurality of pixels arranged on a curved surface;
a mirror configured to reflect light emitted from the display device to form a first image corresponding to the image;
a reflective polarizing element located between the display device and the mirror, the reflective polarizing element configured to transmit a first polarized light of the light emitted from the display device; and
a waveplate located between the reflective polarizing element and the mirror, the waveplate configured to convert the first polarized light transmitted by the reflective polarizing element into a circularly polarized light; wherein:

the mirror is configured to reflect, toward the waveplate, the circularly polarized light emitted from the waveplate;

the waveplate is configured to convert the circularly polarized light reflected by the mirror into a second polarized light;

the reflective polarizing element is configured to reflect, toward a formation position of the first image, the second polarized light emitted from the waveplate; and the mirror is substantially telecentric at the first image side.

* * * * *